(12) United States Patent
Intonato et al.

(10) Patent No.: US 11,344,786 B2
(45) Date of Patent: May 31, 2022

(54) USER INTERFACE WITH INTERACTIVE MAPPING AND SEGMENTED TIMELINE

(71) Applicant: Peloton Interactive, Inc., New York, NY (US)

(72) Inventors: Joseph Intonato, Brooklyn, NY (US); Katherine Lorelli Wallace, Brooklyn, NY (US); Alexander Choong Sik Lawrence-Richards, Brooklyn, NY (US); Ivy Lee, New York, NY (US); Feibi Wen McIntosh, Brooklyn, NY (US); Jaeyoon Song, Harrison, NJ (US); Dean Rex Silfen, New York, NY (US); Dalton Lee Claybrook, New York, NY (US)

(73) Assignee: PELOTON INTERACTIVE, INC., New York, NY (US)

( * ) Notice: Subject to any disclaimer, the term of this patent is extended or adjusted under 35 U.S.C. 154(b) by 194 days.

(21) Appl. No.: 16/874,453

(22) Filed: May 14, 2020

(65) Prior Publication Data
US 2020/0360794 A1 Nov. 19, 2020

Related U.S. Application Data

(60) Provisional application No. 62/848,528, filed on May 15, 2019.

(51) Int. Cl.
| | |
|---|---|
| *G06F 3/048* | (2013.01) |
| *A63B 71/06* | (2006.01) |
| *G06F 3/0482* | (2013.01) |
| *G06F 3/04817* | (2022.01) |
| *A63B 24/00* | (2006.01) |

(52) U.S. Cl.
CPC ...... *A63B 71/0622* (2013.01); *A63B 24/0062* (2013.01); *A63B 71/0686* (2013.01); *G06F 3/0482* (2013.01); *G06F 3/04817* (2013.01); *A63B 2071/0625* (2013.01); *A63B 2071/0661* (2013.01); *A63B 2071/0694* (2013.01); *A63B 2220/18* (2013.01); *A63B 2220/20* (2013.01); *A63B 2230/75* (2013.01)

(58) Field of Classification Search
CPC ............ A63B 71/0622; A63B 24/0062; A63B 71/0686; G06F 3/04817; G06F 3/0482
See application file for complete search history.

(56) References Cited

U.S. PATENT DOCUMENTS

| | | | |
|---|---|---|---|
| 10,220,258 B2 * | 3/2019 | Gu .......................... | G01C 21/20 |
| 11,103,161 B2 * | 8/2021 | Williams .............. | G06F 3/0362 |

(Continued)

*Primary Examiner* — David Phantana-angkool
(74) *Attorney, Agent, or Firm* — AMPACC Law Group, PLLC

(57) ABSTRACT

Systems and methods for generating user interface elements associated with a guided workout are disclosed herein. For example, by analyzing location data associated with a user device, along with digital content corresponding to the guided workout, the system may generate user interface elements including graphical representations, segmented timelines, and performance metrics associated with a user's progress and performance while consuming the guided workout content. These interface elements may be displayed to the user during and/or after the workout and may allow for user interaction to view varying levels of detail associated with the interface elements.

20 Claims, 12 Drawing Sheets

(56) References Cited

U.S. PATENT DOCUMENTS

| | | | |
|---|---|---|---|
| 11,148,007 B2 * | 10/2021 | Williams | A63B 71/0622 |
| 11,154,660 B2 * | 10/2021 | Sjolund | A61M 5/31546 |
| 11,216,119 B2 * | 1/2022 | De Vries | G06F 3/04883 |
| 2006/0136173 A1 * | 6/2006 | Case | A63B 24/0003 |
| | | | 702/182 |
| 2015/0081210 A1 * | 3/2015 | Yeh | G06F 16/60 |
| | | | 701/428 |
| 2016/0375306 A1 * | 12/2016 | Gu | G01C 21/3676 |
| | | | 701/430 |
| 2020/0360794 A1 * | 11/2020 | Intonato | G06F 3/04817 |

* cited by examiner

200

```
┌─────────────────────────────────────────────────────────────┐
│ RECEIVE, WITH A PROCESSOR ASSOCIATED WITH A USER DEVICE,    │
│ DIGITAL CONTENT CORRESPONDING TO A GUIDED WORKOUT           │
│ COMPRISING ONE OR MORE SEGMENT TYPES                        │
│ 202                                                         │
└─────────────────────────────────────────────────────────────┘
                              │
                              ▼
┌─────────────────────────────────────────────────────────────┐
│ CAUSE, WITH THE PROCESSOR, A LOCATION SENSOR OF THE USER    │
│ DEVICE TO DETERMINE LOCATION DATA ASSOCIATED WITH THE       │
│ USER DEVICE                                                 │
│ 204                                                         │
└─────────────────────────────────────────────────────────────┘
                              │
                              ▼
┌─────────────────────────────────────────────────────────────┐
│ GENERATE, WITH THE PROCESSOR AT LEAST ONE OF A GRAPHICAL    │
│ REPRESENTATION CORRESPONDING TO THE LOCATION DATA, A        │
│ PERFORMANCE METRIC INDICATOR CORRESPONDING TO THE           │
│ LOCATION DATA, OR A SEGMENTED TIMELINE INCLUDING            │
│ A PLURALITY OF SEGMENTS                                     │
│ 206                                                         │
└─────────────────────────────────────────────────────────────┘
                              │
                              ▼
┌─────────────────────────────────────────────────────────────┐
│ GENERATE, WITH THE PROCESSOR, A FIRST USER INTERFACE        │
│ INCLUDING THE SEGMENTED TIMELINE DISPLAYED TOGETHER WITH    │
│ THE GRAPHICAL REPRESENTATION                                │
│ 208                                                         │
└─────────────────────────────────────────────────────────────┘
                              │
                              ▼
┌─────────────────────────────────────────────────────────────┐
│ GENERATE, WITH THE PROCESSOR, A SECOND USER INTERFACE       │
│ INCLUDING THE SEGMENTED TIMELINE DISPLAYED TOGETHER WITH    │
│ THE PERFORMANCE METRIC INDICATOR                            │
│ 210                                                         │
└─────────────────────────────────────────────────────────────┘
                              │
                              ▼
┌─────────────────────────────────────────────────────────────┐
│ PROVIDE ONE OR MORE USER INTERFACE ELEMENTS CONFIGURED      │
│ TO ALLOW SWITCHING BETWEEN DISPLAY OF THE FIRST USER        │
│ INTERFACE AND THE SECOND USER INTERFACE DURING THE          │
│ SEGMENT TYPE                                                │
│ 212                                                         │
└─────────────────────────────────────────────────────────────┘
```

*FIG. 2*

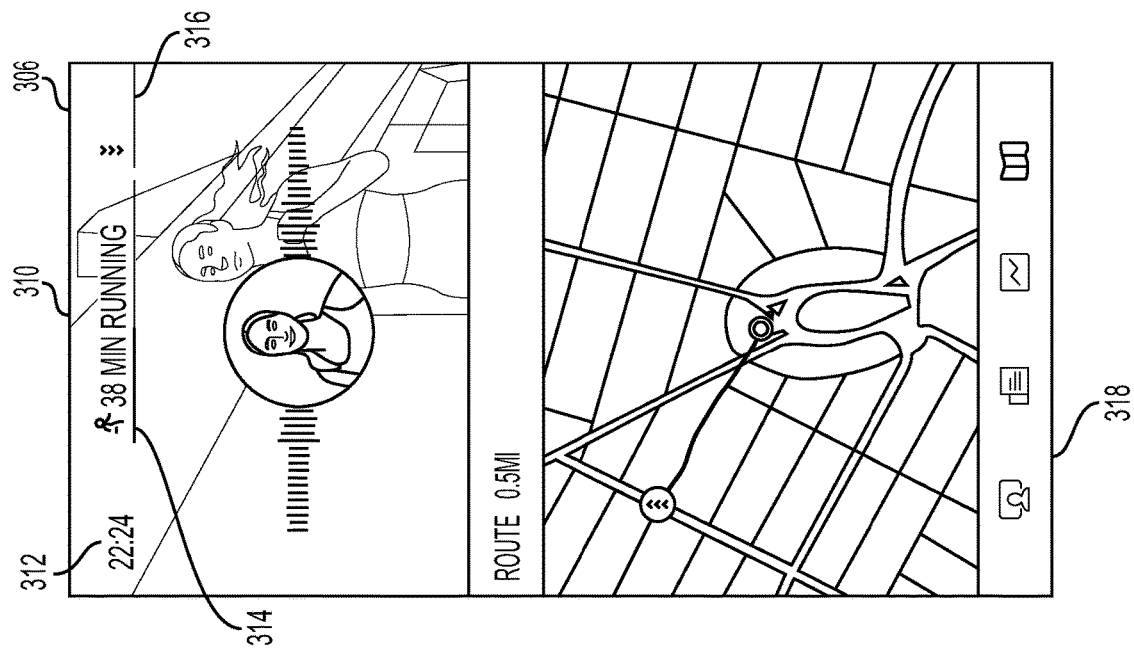
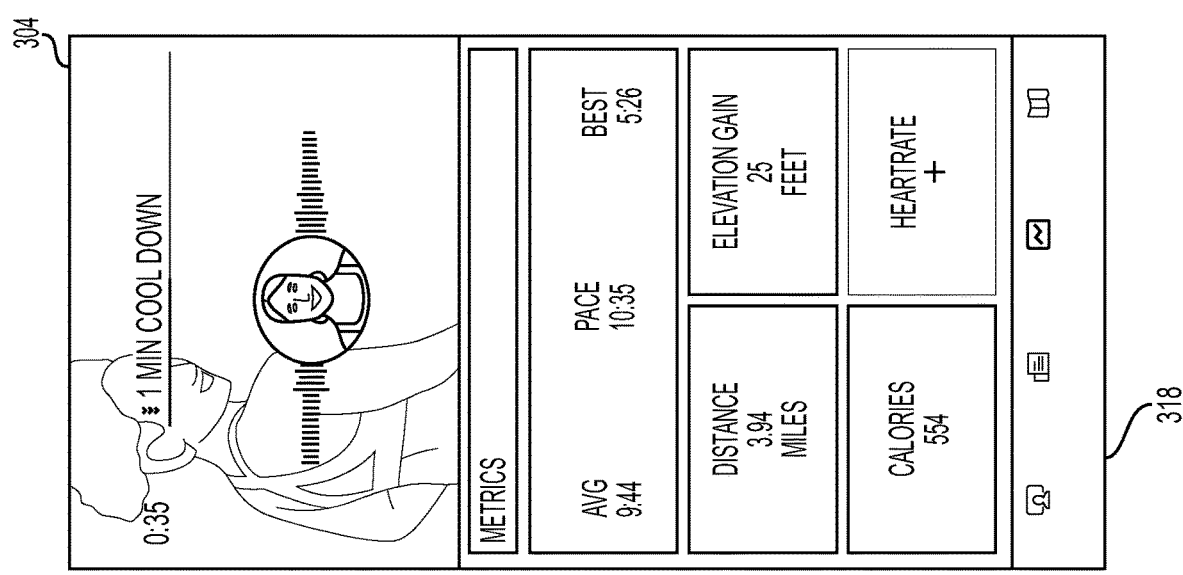
FIG. 3B

400

RECEIVE, WITH A PROCESSOR ASSOCIATED WITH A USER DEVICE, DIGITAL CONTENT CORRESPONDING TO A GUIDED WORKOUT COMPRISING ONE OR MORE SEGMENT TYPES
402

CAUSE, WITH THE PROCESSOR, A LOCATION SENSOR OF THE USER DEVICE TO DETERMINE LOCATION DATA ASSOCIATED WITH THE USER DEVICE
404

GENERATE, WITH THE PROCESSOR, AT LEAST ONE OF A GRAPHICAL REPRESENTATION CORRESPONDING TO THE LOCATION DATA OR A SEGMENTED TIMELINE INCLUDING A PLURALITY OF SEGMENTS
406

GENERATE, WITH THE PROCESSOR, A FIRST USER INTERFACE INCLUDING THE SEGMENTED TIMELINE DISPLAYED TOGETHER WITH THE GRAPHICAL REPRESENTATION
408

GENERATE, WITH THE PROCESSOR, A LISTING OF ONE OR MORE USERS RECEIVING THE DIGITAL CONTENT, THE LISTING INCLUDING AT LEAST ONE OF A PROGRESS INDICATOR ASSOCIATED WITH INDIVIDUAL USERS OR AN INTERACTION ELEMENT ENABLING AN INTERACTION BETWEEN A USER ASSOCIATED WITH THE USER DEVICE AND THE ONE OR MORE USERS 410

GENERATE, WITH THE PROCESSOR, A SECOND USER INTERFACE INCLUDING THE SEGMENTED TIMELINE DISPLAYED TOGETHER WITH THE LISTING
412

PROVIDE ONE OR MORE USER INTERFACE ELEMENTS CONFIGURED TO ALLOW SWITCHING BETWEEN THE DISPLAY OF THE FIRST USER INTERFACE AND THE SECOND USER INTERFACE DURING THE SEGMENT TYPE
414

```
┌─────────────────────────────────────────────────────────────┐
│ RECEIVE, WITH A PROCESSOR ASSOCIATED WITH A USER DEVICE,    │
│ DIGITAL CONTENT CORRESPONDING TO A GUIDED WORKOUT           │
│ COMPRISING ONE OR MORE SEGMENT TYPES                        │
│ 602                                                         │
└─────────────────────────────────────────────────────────────┘
                              ↓
┌─────────────────────────────────────────────────────────────┐
│ CAUSE, WITH THE PROCESSOR, A LOCATION SENSOR OF THE USER    │
│ DEVICE TO DETERMINE LOCATION DATA ASSOCIATED WITH THE       │
│ USER DEVICE                                                 │
│ 604                                                         │
└─────────────────────────────────────────────────────────────┘
                              ↓
┌─────────────────────────────────────────────────────────────┐
│ GENERATE, WITH THE PROCESSOR, AT LEAST ONE OF A GRAPHICAL   │
│ REPRESENTATION CORRESPONDING TO THE LOCATION DATA OR A      │
│ SEGMENTED TIMELINE INCLUDING A PLURALITY OF SEGMENTS        │
│ 606                                                         │
└─────────────────────────────────────────────────────────────┘
                              ↓
┌─────────────────────────────────────────────────────────────┐
│ GENERATE, WITH THE PROCESSOR, A FIRST USER INTERFACE        │
│ INCLUDING THE SEGMENTED TIMELINE DISPLAYED TOGETHER WITH    │
│ THE GRAPHICAL REPRESENTATION                                │
│ 608                                                         │
└─────────────────────────────────────────────────────────────┘
                              ↓
┌─────────────────────────────────────────────────────────────┐
│ GENERATE, WITH THE PROCESSOR, A LISTING OF ONE OR MORE      │
│ INTERACTIONS BETWEEN A USER ASSOCIATED WITH THE USER        │
│ DEVICE AND ONE OR MORE USERS RECEIVING THE DIGITAL CONTENT  │
│ ON ONE OR MORE ADDITIONAL USER DEVICES                      │
│ 610                                                         │
└─────────────────────────────────────────────────────────────┘
                              ↓
┌─────────────────────────────────────────────────────────────┐
│ GENERATE, WITH THE PROCESSOR, A SECOND USER INTERFACE       │
│ INCLUDING THE SEGMENTED TIMELINE DISPLAYED TOGETHER WITH    │
│ THE LISTING                                                 │
│ 612                                                         │
└─────────────────────────────────────────────────────────────┘
                              ↓
┌─────────────────────────────────────────────────────────────┐
│ PROVIDE ONE OR MORE USER INTERFACE ELEMENTS CONFIGURED TO   │
│ ALLOW SWITCHING BETWEEN THE DISPLAY OF THE FIRST USER       │
│ INTERFACE AND THE SECOND USER INTERFACE                     │
│ 614                                                         │
└─────────────────────────────────────────────────────────────┘
```

FIG. 6

USER INTERFACE WITH INTERACTIVE MAPPING AND SEGMENTED TIMELINE

CROSS-REFERENCE TO RELATED APPLICATIONS

This application is a nonprovisional of and claims priority to U.S. Provisional Application No. 62/848,528, filed on May 15, 2019, the entire disclosure of which is incorporated herein by reference.

FIELD OF THE INVENTION

This application relates generally to the field of exercise equipment and methods associated therewith. In particular, this application relates to an exercise system and method configured to provide streaming and on-demand exercise classes to one or more users.

BACKGROUND

Humans are competitive by nature, striving to improve their performance both as compared to their own prior efforts and as compared to others. Humans are also drawn to games and other diversions, such that even tasks that a person may find difficult or annoying can become appealing if different gaming elements are introduced. Existing home and gym-based exercise systems and methods frequently lack key features that allow participants to compete with each other, converse with each other, and that gamify exercise activities. Further, existing exercise systems and methods that are designed to allow a user to participate in workouts outside of the home or gym, such as on outside running paths, frequently lack features that allow participants to accurately track their performance metrics, during and/or after the workout, with respect to their location.

While some existing exercise equipment incorporates diversions such as video displays that present content or performance data to the user while they exercise, these systems lack the ability to truly engage the user in a competitive or gaming scenario that improves both the user's experience and performance. Such systems also lack the ability to facilitate real-time sharing of information, conversation, data, and/or other content between users, as well as between an instructor and one or more users.

To improve the experience and provide a more engaging environment, gyms offer exercise classes such as aerobics classes, yoga classes, or other classes in which an instructor leads participants in a variety of exercises. Such class-based experiences, however, are accessible only at specific times and locations. As a result, they are unavailable to many potential users, generally are very expensive, and often sell-out so that even users in a location convenient to the gym cannot reserve a class. Example embodiments of the present disclosure address these problems by providing user interfaces that facilitate live streaming of instructional content, streaming of archived instructional content, socially networked audio and video chat, networked performance metrics, competition capabilities, a range of gamification features, and location-based performance metrics.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

FIG. 2 illustrates a flow chart corresponding to an example method of the present disclosure.

FIGS. 3A and 3B illustrate example user interfaces of the present disclosure. The user interfaces shown in FIGS. 3A and 3B correspond to the method described herein with respect to FIG. 2.

FIG. 4 illustrates another example flow chart corresponding to an example method of the present disclosure.

FIG. 6 illustrates another example flow chart corresponding to an example method of the present disclosure.

DETAILED DESCRIPTION

Figure 1:
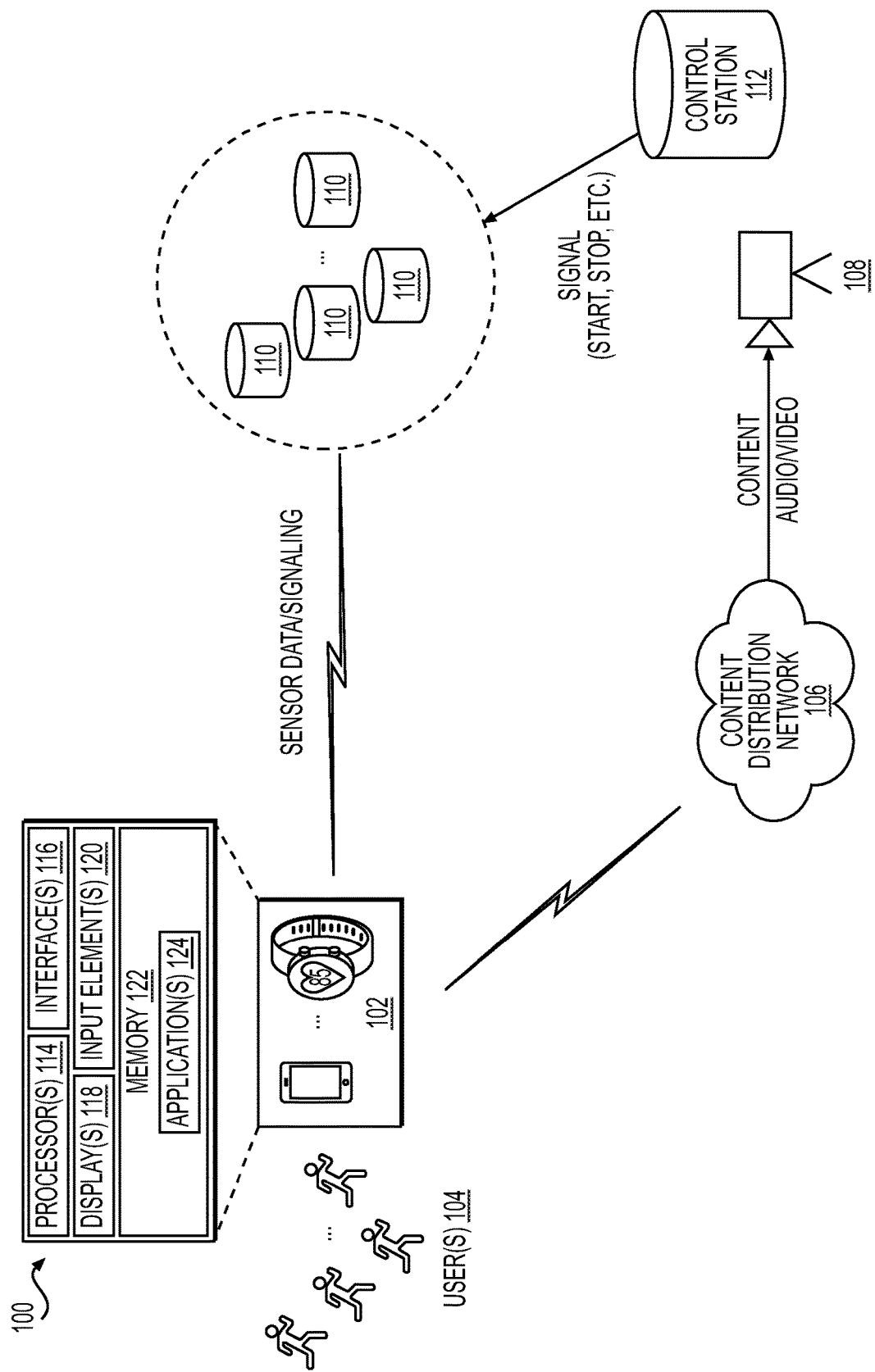
FIG. 1 illustrates a basic network architecture according to an example embodiment of the present disclosure.

The following description is presented to enable any person skilled in the art to make and use aspects of the example embodiments described herein. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the present disclosure. Thus, the present disclosure is not intended to be limited to the embodiments shown, but is to be accorded the widest possible scope consistent with the principles and features disclosed herein.

Systems and methods for interactive user interfaces relating to guided digital workouts are provided herein. In particular, the systems and methods described herein provide techniques for providing guided digital workout content to a user device, where location data corresponding to a location of the user device is collected throughout the guided workout. Utilizing the digital content and the location data, a process of the user device may generate one or more interactive user interfaces (user interfaces) both during the guided workout and after the workout is complete. For example, the interactive user interfaces may include a segmented timeline, a graphical representation corresponding to the location data, a listing of all users receiving the digital content, a listing of user interactions among the users receiving the digital content, and/or one or more summary performance metric interfaces. The user interfaces may allow a user associated with the user device to monitor both their location and their performance throughout the guided workout, and once the workout is complete.

Conventional interactive user interfaces utilizing location data, such as current fitness tracking applications, may provide delayed and/or inaccurate information to users. As such, it may be difficult for users to view real-time location information and/or performance metrics associated with a particular location and point in time of a workout. The interactive user interfaces described herein present real-time, accurate location and performance information to users. In addition, the interactive user interfaces may be rendered both in real-time and post workout, to allow the user to view additional information associated with both current and summary performance metrics. Thus, the user may have access to timely and accurate location and performance tracking.

In an example embodiment of the present disclosure, as described herein, digital content may be received on a user device. For example, the digital content may include one or more segment types associated with various portions of a guided workout class, such as an outdoor guided workout including one or more running or running segments, strength segments, and the like. The digital content may be displayed via an interface of the user device. In addition, a user input may be received, via the user device, indicating a request to gather location data associated with the user device during a segment type. For example, the user may provide permission to an application displaying the digital content to gather location data throughout the running/walking segments of the guided workout. In particular, the location data may include data collected from a location sensor of the user device, such as global positioning system (GPS) data. In response to receiving the input, the location data may be gathered throughout the duration of the guided workout, such as at predetermined intervals, and may indicate a current location of the user device.

In examples, the process may generate various user interface elements utilizing the digital content and the location data. For example, a graphical representation, such as a map, corresponding to the location data may be generated during a particular segment type, such as a running or walking segment, of the guided workout. The graphical representation may include, for example, a map with one or more visual indicators of the current location of the user device, the path that has been traversed during the workout, and the like. In addition, a performance metric indicator corresponding to the location data may be generated. For example, given the location data associated with the user device, a performance metric indicator may be generated to indicate the performance of the user. For example, based on the location data, the performance metric indicator may indicate the distance traversed, elevation gain, current pace, best pace, average page, calories burned, current heart rate, average heart rate, best heart rate, and the like, associated with the user.

The various user interface elements generated may further include a segmented timeline including a plurality of segments associated with the segment types. For example, the segmented timeline may include a plurality of segments corresponding to a warm up segment, one or more running or walking segments, one or more strength training segments (e.g., a bootcamp segment), a cool down segment, and the like. The techniques may also include generating one or more listings. The one or more listings may include a listing of the users currently receiving the digital content. The current user listing may also include interface elements such as a progress indicator associated with each user and/or an interaction element configured to allow users to interact with one another. The listing(s) may also include details of interactions between a user and one or more additional users receiving the content at the same time. For example, the listing may include user interactions such as high-fives, congratulatory actions, and the like, among current users.

In some examples, the processor may generate one or more user interfaces during each segment type of the guided workout that incorporate one or more of the user interface elements generated as described herein. For example, a first user interface may include the segmented timeline displayed together with the graphical representation. In this example, the user may view their current location, as well as the distance/route traversed, along with the segmented timeline. In this way, the user may view their current location data, as represented on a graphical map, along with their progress along the segmented timeline. In examples, a second user interface may include the segmented timeline displayed together with one or more performance metric indicators. In this example, the user may view their current performance metrics, such as calories burned, current pace, and the like, along with their progress along the segmented timeline.

In examples, the user interfaces may further include one or more user interface elements configured to allow the user to switch between a display of the various user interfaces. For example, the user may select an icon indicating a desire to view the graphical representation. In response, the system may display the graphical interface including the segmented timeline displayed along with the graphical representation. In other examples, the user may select an icon indicating a desire to view a current user listing. In response, the system may transition from displaying the first user interface to generating another user interface including the segmented timeline displayed along with the listing of current users receiving the digital content.

In this way, users of the system described herein may navigate seamlessly between various user interfaces. Further, such user interfaces may be generated in real-time and on demand, thereby allowing users to view timely and accurate information associated with their participation in the guided workout. Thus, the user may be presented with an enhanced digital content viewing experience that eliminates unnecessary, delayed, or inaccurate information and/or information the user does not wish to view.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details pertaining to the above-mentioned techniques are described below with reference to several example embodiments of FIGS. 1-11. It is to be appreciated that while these figures describe example environments and devices that may utilize the claimed techniques, the techniques may apply equally to other environments, devices, and the like.

FIG. 1 illustrates a network architecture according to an example embodiment of the present disclosure. In this example, the system shown in FIG. 1 may be configured to feed synchronized live and/or archived video content, such as the outdoor guided workouts described herein, and live and/or archived sensor data to user over the network. For example, as depicted in FIG. 1, a networked exercised system 100 may be configured with and/or may otherwise include a plurality of user devices 102 associated with a plurality of users 104 and in communication with a content distribution network 106 that receives audio/video content from one or more content sources 108. The user devices 102 may also be in communication with various other networks and servers. For example, the user devices 102 may be in communication with various databases 110 to enable the user devices 102 and databases 110 to exchange sensor data, performance data, and/or signaling. A control station 112 may also provide signals via the network to control the collection, storage, analysis, and management of data across the system 100.

The user devices 102 may include various devices associated with the users 104, such as handheld devices (e.g., tablets, mobile devices, etc.) and/or wearable devices (e.g., fitness trackers, smart watches, heart rate monitors, etc.). The user devices 102 may include components such as, for example, one or more processors 114, one or more network interfaces 116, one or more displays 118, one or more input elements 120, and/or memory 122. The memory 122 may include components such as, for example, one or more applications 124 and may include, for example, one or more servers. The one or more applications 124 may be configured to enable the user devices 102 to stream the guided content via the display(s) 118. It should be understood that the examples provided herein are illustrative and should not be considered the exclusive examples of the components of the user device. Additionally, one or more of the components of the user device may be generally utilized to perform one or more of the actions, operations, and/or steps described herein as being performed by the user.

In some embodiments the user devices 102 may include one or more sensors configured to sense, detect, measure, and/or otherwise determine various performance metrics from the user, instantaneously and/or over time. For example, the user device may include one or more sensors that detect location information, motion information, and the like, associated with the users 104 and user devices 102 during the course of the various workouts. For example, a user device 102, such as a wearable device, may include sensors to measure user heart-rate, respiration, hydration, calorie burn, or any other physical performance metrics, and/or to receive such data from sensors provided by the users 104. Where appropriate, such performance metrics can be calculated as current/instantaneous values, maximum, minimum, average, or total over time, or using any other statistical analysis. Trends can also be determined, stored in the various databases 110, and displayed to the user, the instructor, and/or other users 104. Such sensors may communicate with the memory 122 and/or processors 114 of the digital hardware associated with the wearable device, nearby, or at a remote location, using wired or wireless connections of the system 100.

One or more displays 118 connected to and/or otherwise associated with the user devices 102 may be driven by a user input device such as a touchscreen, mouse, voice control, or other suitable input device. In some examples, the display 118 or at least a portion thereof, may comprise a touchscreen configured to receive touch input from a user 104. In various exemplary embodiments the user 104 can use the display or one or more user interfaces (user interfaces) displayed on the display 118 to selectively present a range of different information including live and/or archived video, performance data, and other user and system information received from at least one of the content distribution network 106 (e.g., audio/video content from one or more content sources 108) or the one or more databases 110. As will be described below, such user interfaces can provide a wide range of control and informational windows that can be accessed and removed individually and/or as a group by a click, touch, voice command, or gesture. In various exemplary embodiments, such windows may provide information about the user's 104 performance and/or the performance of other participants in the same class both past and present.

Example user interfaces presented via the display may be used to access member information, login and logout of the system, access digital audio/video content such as live exercise classes, archived classes, or other content. User information may be displayed in a variety of formats and may include historical and current performance and account information, social networking links and information, achievements, etc. The user interfaces described herein can also be used to access the system to update profile or member information, manage account settings such as information sharing, and control device settings.

An example user interface may also be presented on the one or more displays to allow users to manage their experience, including selecting information to be displayed and arranging how such information is displayed on the display. Such a user interface may present multiple types of information overlaid such that different types of information can be selected or deselected easily by the user. For example, performance metrics and/or other information may be displayed over video content using translucent or partially transparent elements so the video behind the information elements can be seen together with (i.e., simultaneously with) the performance metrics and/or other information itself. Further, example user interfaces may present a variety of screens to the user which the user can move among quickly using the provided user input device, including by touching if a touchscreen is used.

In various example embodiments, a processor of the present disclosure may be programmed and/or otherwise configured to generate and provide various user interfaces to a plurality of users such that the users may participate in live or archived workouts.

FIG. 2 provides a flow chart illustrative of an example method 200 of the present disclosure. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted, and any number of the described operations may be combined in any order and/or in parallel to implement process. Any number of the described blocks may be combined in any order and/or in parallel to implement the process, or alternative processes, and not all of the blocks need be executed. It should be understood that some or all of these operations may be performed by some or all of components, devices, and/or systems described herein. For discussion purposes, the processes are described with reference to the environments, architectures and systems described in the examples herein, such as, for example those described with respect to FIGS. 1-11, although the processes may be implemented in a wide variety of other environments, architectures and systems.

For example, at block 202 the system 100 may receive, with a processor 114 associated with a user device 102, digital content corresponding to a guided workout. For instance, as described with respect to FIG. 1, a processor 114 associated with a user device 102 of the system 100 may receive, from a remote server via the content distribution network 106, an audio file, a video file, and/or any other content file including the guided workout from a content source 108. The guided workout may include one or more segment types associated with the workout. For example, the segment type may be associated with each type of activity presented in the guided workout. For instance, the segment types may include, but not be limited to, a warm up segment, one or more running or walking segments, one or more strength segments (e.g., a bootcamp segment), and/or a cool down segment, and the like.

The guided workout, and associated segment types, may be associated with a production studio and/or other performance facility associated with the content source 108 at which an instructor is performing and/or dictating aspects of the guided workout. For example, the guided workout, received at the user device 102 from the content distribution network 106 as a content file, may include one or more visual components and/or one or more audio components of a recorded workout. The guided workout may further include real-time content input and/or the content may include content that has been previously recorded and may be accessed/received at any time by the user (e.g., on demand) via the network.

Figure 3A:
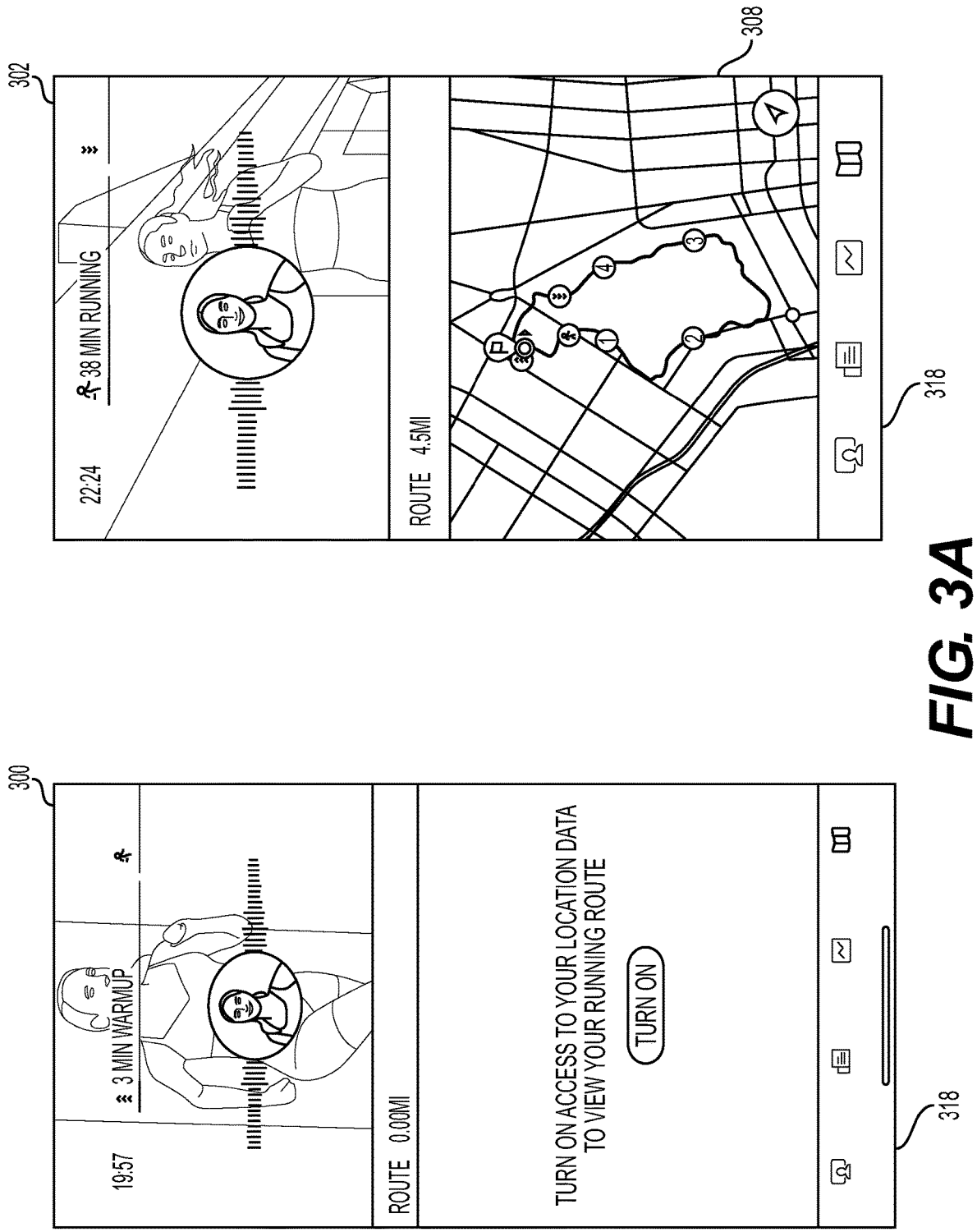

At block 204, the processor 114 may cause a location sensor of the user device 102 to determine location data associated with the user device 102. For example, the processor 114 receive a first input indicating a request to gather location data associated with the user device 102 during a segment type. For instance, the user 104 may provide a user input via a display component 118 of the user device 102 indicating that the user 104 allows location data to be gathered during the guided workout. As such, the processor 114 may receive a signal indicating the user input and the processor 114 may then cause one or more location sensors of the user device 102 to detect and record location data associated with the user device 102. Such an example user interface 300 is illustrated in FIG. 3A. As shown in FIG. 3A, once the user has selected the guided workout they wish to receive, the processor 114 may generate an example user interface 300 and presented to a user at the beginning of the guided workout. The user interface 300 may include an interface element 220 configured to be selectable by the user 104 to enable an application through which the guided workout is being provided to record location data associated with the user device 104.

The location data may be detected by one or more sensors of the user device 102 configured to provide information associated with a location, motion information, and the like. For example, a global positioning system (GPS) receiver of the user device 102 1 may be utilized to collect location data. In other examples, a gyroscope, altimeter, barometer, and/or other sensor data of the user device 102 1 may be utilized to determine motion information and/or elevation information (e.g., elevation gain, elevation change, etc.).

In response to receiving the input, the processor 114 may configure the sensor(s) of the user device 102 to determine location data associated with the user device 102 during the guided workout. For example, as described herein, the processor 114 may cause one or more sensors of the user device 102 to collect and utilize various sensor data associated with the user device 102 during the guided workout. In some examples, the processor 114 may configure the sensors to collect location data only during certain segment types. For example, the sensors may be configured to collect location data only when the user device 102 is receiving digital content associated with the warm up segment, running or walking segment(s), and/or cool down segment. In this example, the sensors may be configured to stop collecting location data when the user device 102 is receiving digital content associated with one or more strength segments. During such strength, or bootcamp, segments, the user may be stationary or moving very little while performing one or more strength-based exercises. As such, the processor 114 may cease collecting location data to prevent the performance metrics (e.g., pace, distance, etc.) from having inaccuracies. For example, the processor 114 may determine a slower pace of the user by utilizing location data when the user is stagnant.

At step 206, the processor 114 may generate at least one of a graphical representation corresponding to the location data, a performance metric indicator corresponding to the location data, or a segmented timeline including a plurality of segments that may be displayed to the user 104 via one or more user interfaces. Such example user interfaces 302, 304, 306 are illustrated in FIGS. 3A and 3B. As shown in FIG. 3A, the example user interface 302 includes a graphical representation, shown as a map 310, corresponding to the location information. For example, the processor of the system may utilize the location information and/or digital content to generate the map 308 indicating the user's current location, the route that has been traversed during the guided workout, and the like. The graphical representation may include one or more indicator elements such as a current location indicator, distance indicator(s) (e.g., mile markers), segment indicator(s) (e.g., an icon indicating where the warm-up and/or cool down begins and/or ends), a completion indicator, and the like.

Further, the processor 114 may generate a performance metric indicator corresponding to the location data. For example, the processor may utilize the location information and/or the digital content to generate one or more performance metric indicators. For instance, utilizing the location information, the system may utilize the location information to determine an average pace, a current pace, best pace, distance elapsed, calories burned, heart rate, and/or elevation gain associated with the user at any point during the guided workout. These performance metric indicators may correspond to a progress of the user 104 as indicated by the segmented timeline. The performance metric indicator may include a numerical indicator, or the like, to visually display the performance metric information.

In some examples, the performance metric indicator(s) may be displayed to the user 104 via a user interface, as described herein. As shown in FIG. 2B, the example user interface 204 includes various performance metric indicators corresponding to the location data and/or the digital content. For example, the user interface 306 includes numerical values indicating the user's current pace, best pace, average pace, distance traversed, elevation gain, heart rate, and/or calories burned. The performance metrics may be determined based on the location data that has been recorded (e.g., the GPS data may indicate the distance the user has traversed and/or the motion data from the barometer may indicator the elevation gain throughout the guided workout). The performance metric indicators are displayed along with the segmented timeline that indicates the amount of the guided workout that the user has completed. Note that the format, arrangement, and the like of the performance metric indicators may vary in other embodiments of the invention.

In some examples, the performance metrics may be determined according to one or more algorithms or mathematical calculations. For example, one or more data packets may be transmitted to the processor 114 including the various location data. Each data packet may include location data recorded at predetermined intervals. As described herein, the location data may only be collected during walking or running segments in which the user 104 is actively moving (e.g., location data, or distance, is not recorded if the latest location has a 'horizontalAccuracy' value of, for example, less than fifty meters, or another predetermined value). Thus, the performance metric indicating the total distance traversed by the user 104 throughout the guided workout may be determined by calculating a sum of distances between each pair of sequential location data packets. In other examples, the total moving time (e.g., a total time the user is mobile) may be determined by performing a substantially similar calculation as that of the total distance, but with timestamp deltas added between each pair of sequential location data packets.

In some examples, the performance metrics may include one or more pace metrics, such as current pace, average pace, and best pace, as described herein. For example, the current pace may be calculated using a cache of the last several location data packets received from a core location value. In some examples, there must be at least two packets in the cache and packets that are determined to be not "accurate for pace calculation" are discarded. For example, to be determined accurate by the system, locations must have a 'horizontalAccuracy' value of less than fifty meters. In some examples, the accuracy value may comprise another predetermined value. Further, in some examples, packets are removed from the cache when they are over twenty seconds old and a time delta between oldest and newest packet must be at least ten seconds. If at any moment the system is not recording location data, all packets are dropped from the cache. As such, the current pace is calculated as: current pace=time/distance, distance=summed distance between all cached locations, sorted by timestamp, and time=time delta between oldest and newest cached location.

In some examples, a best pace associated with the user 104 is defined as the best pace maintained for thirty seconds during a class. In order to calculate this, the system maintains a buffer of the most recent "current" pace values. Until the buffer is full (e.g., about thirty seconds), the system does not have enough data to calculate a best pace, so a value is not displayed. When a new "current" pace is received, old values are removed from the buffer to make thirty total. Every second after the buffer is full, the worst pace value in the buffer is compared against the current "best" pace and, if this value is better than the previous best, it is stored as the new best pace. In some examples, the intention of "best pace" is to convey the best pace during an interval from an instructor during the guided workout and a thirty second window is used because it corresponds with the length of intervals in the guided workout, such an outdoor running class. However, in other examples, the length of the intervals, and thus the best pace calculation, may vary.

In examples, as described herein the performance metrics may include an elevation gain. In some examples, the elevation gain may be calculated as the sum of every elevation traveled throughout the guided workout. For example, if the user gains five feet of elevation (e.g., runs up five feet), loses seven feet of elevation (e.g., runs down seven feet), and runs up another five feet, the user's elevation gain would be ten feet, as the user has gained ten feet in elevation. This may vary from elevation change, which takes into account the elevation lost throughout the guided workout and indicates a total change in elevation (e.g., in this example the elevation change would be three feet, taking into account the seven feet lost during the workout).

In examples, the elevation gain may be calculated and/or otherwise determined in multiple ways. For example, the elevation gain may be determined using the altimeter, using GPS, and the like. For instance, using an altimeter of the user device 102, the elevation gain may be determined using an 'CMAltimeter' object as provided by a 'CoreMotion' framework. This provides the system with notification every time the altitude of the user device changes. The 'CMAltimeter' provides relative altitude changes and altitude is not provided as distance from sea level, but instead as vertical distance change from the point at which the system began collecting location data (e.g., after the user provided permission). Further, the altitude events reflect the change in the current altitude, not the absolute altitude. Thus, in this example, when the system receives a relative altitude from the 'CMAltimeter,' it is smoothed by applying a minimum threshold of two meters. In other examples, the value utilized as a smoothing value may vary according to other parameters. If a relative altitude is two meters higher or lower from the previous point, it becomes the new accepted position of the user device. When a new accepted position is higher than the previous position, the system adds the value to elevation gain.

In examples using GPS data to determine elevation gain, if the 'CMAltimeter' is not available on the user device, the system utilizes GPS data provided by 'CoreLocation.' 'CoreLocation' provides the system with arrays of 'CLLocation' s. The system may then use the 'altitude' property from these objects to determine elevation gain, which is smoothed in a variety ways. For example, the system may pass the 'CLLocation' to a Kalman Filter in order to remove some level of statistical noise. Further, the system may pass the 'CLLocation' through multiple thresholds. First, the system may apply a minimum threshold of two and a half meters. For example, if a 'CLLocation' is two and a half meters higher or lower from the previous accepted 'CLLocation,' it passes the minimum threshold. The system may also apply a maximum speed based threshold of five meters per second. For example, if a 'CLLocation' has climbed or fallen slower than meters five meters per second from the previously accepted 'CLLocation,' then it passes the maximum threshold. When a 'CLLocation' passes both thresholds, it becomes the new accepted position of the device. When a new accepted position is higher than the previous position, the system adds the value to elevation gain.

In some examples, the maximum threshold is utilized because 'CoreLocation' often reports outlier values hundreds of meters from a "real" (e.g., accurate) location. Thus, the system may use a speed-based approach for the maximum threshold, as opposed to a naive distance-based approach, to increase accuracy. For example, in some examples, the system may not receive GPS data at consistent intervals or times and, when the system does receive additional GPS data, the system may receive 'CLLocation' from a new, increased altitude above the previous elevation. In this example, the system may want to start recording the new 'CLLocation' if it is a reasonable distance from the previously accepted 'CLLocation' to ensure accuracy.

Further, in some examples, the performance metrics determined by the system may include an altitude value associated with the user 104 during the guided workout. Altitude may represent a user's current position from sea level. This information may be used by the system in various elevation graphs on the workout summary (e.g., in association with the performance metrics indicated in the workout summary relating to elevation, as described herein), and to calculate the elevation change over the course of each mile (e.g., for each mile split). To determine altitude, a 'CoreLocation' of the system may provide arrays of 'CLLocation's values. The system may accept and utilize the 'altitude' if it passes a maximum threshold. In some examples, the system may not smooth the data or may only smooth as necessary to generate a graphic associated with the performance metric.

In examples, the system may apply a maximum speed based on a threshold value of five meters per second. Thus, if a 'CLLocation' has climbed or fallen slower than meters five meters per second from the previous accepted 'CLLocation' then the system may determine that it satisfies the maximum threshold value. When a 'CLLocation' satisfies the threshold value, it becomes the new accepted position of the user device and may be used by the system. In some examples, the system may use a threshold value because a 'CoreLocation' often reports outlier values hundreds of meters from a "real" (e.g., accurate) location. Thus, the reason the system may use a speed-based approach for the threshold, as opposed to other approaches such as a naive distance-based approach, is to ensure and increase accuracy. For example, the system may not receive GPS data consistently and may begin receiving 'CLLocation' from an altitude greatly increased from the previous elevation. In this example, the system may want to start recording the new 'CLLocation' if it is a reasonable distance from the previously accepted 'CLLocation' to ensure accuracy.

Still further, the processor 114 may generate a segmented timeline. For example, the processor may utilize the location information and/or the digital content to generate a segmented timeline having one or more segment indicators associated with each segment type. For example, as described herein, the segmented timeline may include a different visual indicator (e.g., a solid line, dashed line, etc.) to represent each segment type of the guided workout. In addition, the segmented timeline may include one or more numerical time indicator to indicate a current elapsed time, time left, and the like, associated with the guided workout. Further, the segmented timeline may include a completion indicator indicating the user's progress throughout the guided workout. For example, a solid line rendered or displayed over the segmented timeline may indicate a portion of the guided workout that has been completed.

In some examples, the segmented time may be displayed to the user 104 via a user interface, as described herein. As shown in FIG. 3B, the example user interface 308 includes a segmented timeline 310 corresponding to the location data and/or the digital content. For example, the user interface 306 includes an elapsed time value 312 indicating the time that has elapsed since the guided workout began. The segmented timeline 310 may further include one or more segment indicators 314, 316 corresponding to the various segment types of the guided workout. For example, a first segment indicator 314 may indicate or correspond to a first type of segment, a running segment, and may be represented by a solid line along with a running icon. Further, a second segment indicator 316 may indicate or correspond to a second type of segment, a cool down segment, and may be represented by a solid line along with down pointing arrows. In some examples, a strength segment (not shown) may be represented by a dotted line. Note that the format, arrangement, indicators, and the like of the segmented timeline may vary in other embodiments of the invention.

At step 208, the processor 114 may generate a first user interface including the segmented timeline displayed together with the graphical representation. For example, as shown in FIG. 3A, and described herein, the processor 114 may be configured to generate a user interface 302 that displays the segmented timeline together with the graphical representation 308. In some examples, the segmented timeline may be displayed via a user interface throughout the entirety of the guided workout. Further, in response to a user input indicating that the user 104 wishes to view the graphical representation, the processor 114 may generate the user interface 302 including the segmented timeline displayed alongside the map 308 corresponding to the location data.

At step 210, the processor 114 may generate a second user interface including the segmented timeline displayed together with the performance metric indicator. For example, as shown in FIG. 3B, and described herein, the processor 114 of the system 100 may be configured to generate an additional user interface 306 that displays the segmented timeline together with the performance metric indicator(s). In some examples, in response to a user input indicating that the user 104 wishes to view the performance metric(s), the system may generate a user interface including the segmented timeline displayed alongside a one or more visual indicators corresponding to the performance metric(s), such as numerical indicators of heart rate, calories burned, and the like.

At step 212, the processor 114 may provide one or more user interface elements configured to allow switching between display of the first user interface and the second user interface during the guided workout. For example, as shown in FIGS. 3A and 3B, each user interface 302, 304, 306 generated by the processor 114 may be associated with one or more navigational user interface elements 318. For instance, a map icon, as highlighted in user interface 302, may represent a user interface element that, when selected by a user 104, displays the user interface 302 displaying the segmented timeline along with the graphical representation 308. In another example, a metric icon, as highlighted in user interface 304, may represent a second user interface element that, when selected by the user 104, transitions from displaying the first user interface 302 to displaying the second user interface 304 including the segmented timeline along with the one or more performance metric indicators.

The navigational user interface elements 318 may allow the user 104 to transition between the different user interfaces 302, 304, 306 generated by the system seamlessly and on demand, thereby allowing the user to view various information (e.g., a map, metrics, etc.) associated with their progress and/or performance throughout the guided workout. In this way, the user may access various user interfaces on demand and view real-time, accurate information regarding their guided workout.

FIG. 4 illustrates another example flow chart corresponding to an example method of the present disclosure. FIG. 4 provides a flow chart illustrative of an example method 400 of the present disclosure in which a processor generates and provides interactive user interfaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted, and any number of the described operations may be combined in any order and/or in parallel to implement process. Any number of the described blocks may be combined in any order and/or in parallel to implement the process, or alternative processes, and not all of the blocks need be executed. It should be understood that some or all of these operations may be performed by some or all of components, devices, and/or systems described herein. For discussion purposes, the processes are described with reference to the environments, architectures and systems described in the examples herein, such as, for example those described with respect to FIGS. 1-11, although the processes may be implemented in a wide variety of other environments, architectures and systems.

For example, at block 402 the processor 114 may receive digital content corresponding to a guided workout. For instance, as described with respect to FIG. 1, the processor 114 associated with the user device 102 of the system 100 may receive, from a remote server via the content distribution network 106, an audio file, a video file, and/or any other content file including the guided workout from a content source 108. The guided workout may include one or more segment types associated with the workout, such as a warm up segment, one or more running or walking segments, one or more strength segments (e.g., a bootcamp segment), and/or a cool down segment, and the like. In some examples, the guided workout may include one or more visual components and/or one or more audio components. The guided workout may further include real-time content input and/or the content may include content that has been previously recorded and may be accessed at any time by the user 104 (e.g., on demand).

At block 404, the processor 114 may cause a location sensor of the user device 102 to determine location data associated with the user device 102. For example, as described herein, processor 114 may generate a user interface, such as the user interface 300 of FIG. 3A, enabling the user 104 to provide a user input granting permission to collect location data associated with the user device 104. In response, the processor 114 may cause a sensor of the user device 102 to determine location data associated with the user device 102. The location data may be detected by one or more sensors of the user device 102 configured to provide location data associated with a location, motion information, and the like. For example, a global positioning system (GPS) receiver, gyroscope, altimeter, barometer, and/or other sensor data of the user device may be utilized to determine location information, as well as motion information and/or elevation information (e.g., elevation gain, elevation change, etc.).

In some examples, the processor may be configured to collect location data only during segment types during which the user 104 is walking and/or running. For example, the processor 114 may be configured to collect location data only when the user device 104 is receiving digital content associated with segments in which the user 104 is mobile, such as the warm up segment, walking/running segment(s), and/or cool down segment. In this example, the processor 114 may be configured to stop collecting location data when the user device 102 is receiving digital content associated with one or more strength segments, during which the user 102 may be stationary or moving very little. By utilizing location information only during segment types where the user 102 is actively migrating, this ensures that the performance metrics, such as pace, are accurate.

At step 406, the processor 114 may generate at least one of a graphical representation corresponding to the location data or a segmented timeline including a plurality of segments. For example, the processor 114 may utilize the location information and/or digital content to generate a graphical representation, such as a map or diagram of an area surrounding the user, that indicates the user's current location, the route that has been traversed during the guided workout, and the like. The graphical representation may include one or more indicator elements representing a current location, distance traversed (e.g., mile markers), segment (e.g., an icon indicating where the warm-up and/or cool down begins and/or ends), and the like.

Further, the processor may generate a segmented timeline utilizing the digital content and/or the location information. The segmented timeline may include one or more segment indicators associated with each segment type. For example, as described herein, the segmented timeline may include a different visual indicator (e.g., a solid line, dashed line, etc.) to represent each segment type of the guided workout. In addition, the segmented timeline may include one or more numerical time indicator to indicate a current elapsed time, time remaining, and the like, associated with the guided workout. Further, the segmented timeline may include a completion indicator, such as a solid line overlaying the visual indicators, indicating the portion of the workout the user has completed.

At step 408, the processor 114 may generate a first user interface including the segmented timeline displayed together with the graphical representation. Such an example user interface 302 is illustrated in FIG. 3A. As shown in FIG. 3A, the processor of the system may be configured to generate a user interface 302 that displays the segmented timeline together with the graphical representation, such as a map 308 corresponding to the location data.

At step 410, the processor may generate a listing of one or more users 104 receiving the digital content. In some examples, the listing may include a progress indicator associated with individual users 104, such as a ring around an icon representing the user 104 that indicators a portion of the guided workout that the user 104 has competed. In some examples, the listing may further include an interaction element that allows a first user 104 to interact with additional users that are currently receiving the digital content. For example, the interaction element may include a high-five interaction element that, when selected, transmits an indication to a selected user that they have received a high-five from the first user 104.

Figure 5:
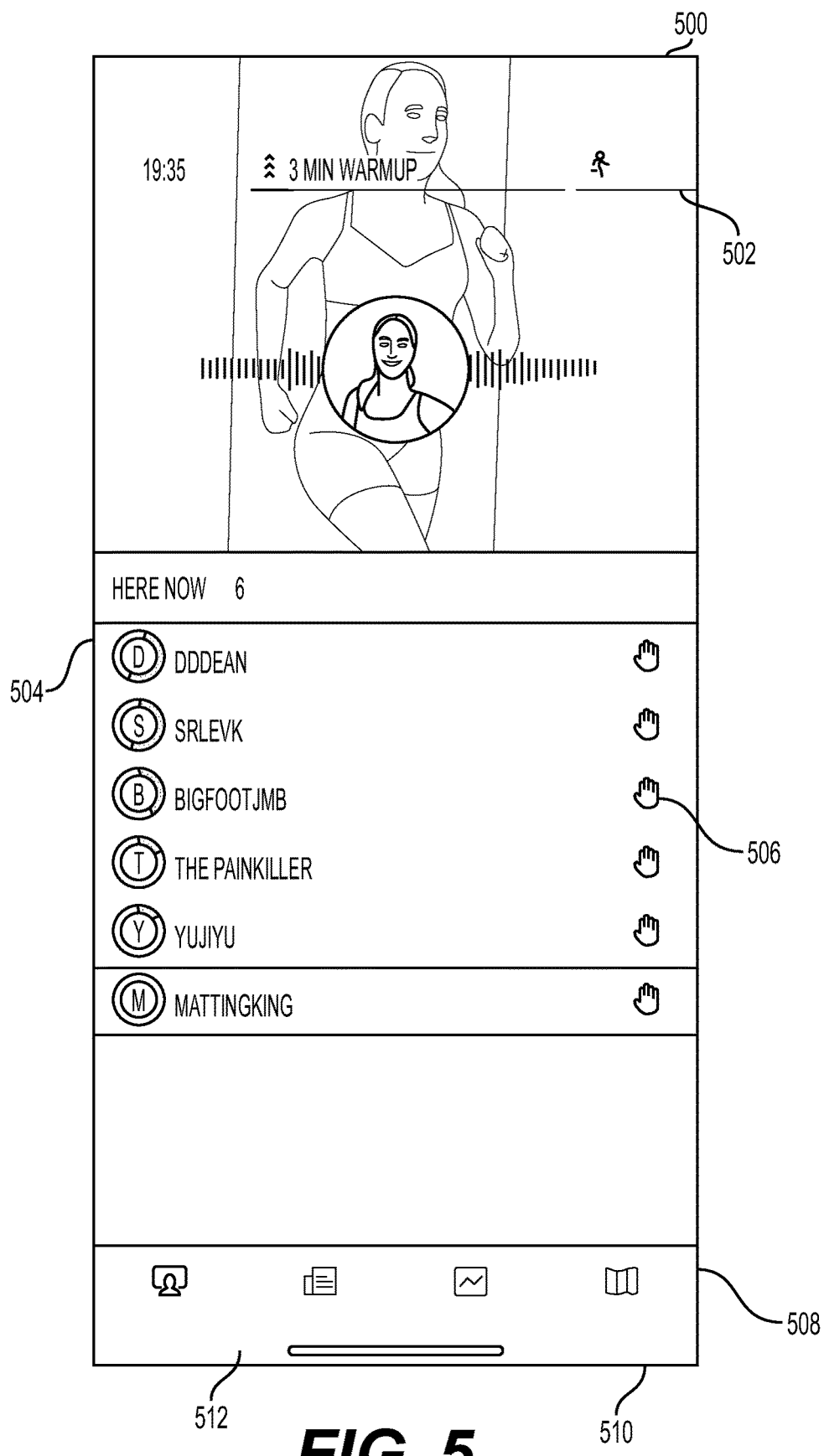
FIG. 5 illustrates another example user interface of the present disclosure. The user interface shown in FIG. 5 corresponds to the method described herein with respect to FIG. 4.

At step 412, the processor 114 may generate a second user interface including the segmented timeline displayed together with the listing. Such an example user interface 500 is illustrated in FIG. 5. As shown in FIG. 5, the second user interface 500 may include both the segmented timeline 502 and the listing 504 of the current users receiving the digital content. As shown in the listing 504, the user interface 500 includes a spherical ring around the user icons that indicates the user's progress through the digital content (e.g., the white ring fills up as the user progresses). Further, as shown in the listing 504, the user interface 500 may include one or more interaction elements 506, configured to be selected by the user 104 of the user device 102 to interact with the current participant. For example, in the user interface 500, the interaction elements 506 include a plurality of hand icons that, when selected by the first user 104, will transmit an indication to the selected user that the first user has congratulated them (e.g., given them a high-five).

At step 414, the processor 114 may provide one or more user interface elements configured to allow switching between display of the first user interface and the second user interface during the guided workout. For example, as shown in the user interface 500, each user interface generated by the processor 114 may be associated with a navigational user interface element. In this example, the user interface 500 includes four navigational user interface elements 508. For instance, the map icon 510 may represent a user interface element that, when selected by a user, displays the first user interface 302 displaying the segmented timeline along with the graphical representation. In another example, a listing icon 512, highlighted in the user interface 500, may represent a second user interface element that, when selected by the user 104, transitions from displaying the first user interface 302 to displaying the second user interface 500 including the segmented timeline 502 along with the listing 504 of current users, or class participants. The navigational user interface elements 508 may allow the user 104 to transition between the different user interfaces generated by the processor to view real-time, accurate information regarding their guided workout.

FIG. 6 illustrates another example flow chart corresponding to an example method of the present disclosure. FIG. 6 provides a flow chart illustrative of an example method 600 of the present disclosure in which a processor generates and provides interactive user interfaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted, and any number of the described operations may be combined in any order and/or in parallel to implement process. Any number of the described blocks may be combined in any order and/or in parallel to implement the process, or alternative processes, and not all of the blocks need be executed. It should be understood that some or all of these operations may be performed by some or all of components, devices, and/or systems described herein. For discussion purposes, the processes are described with reference to the environments, architectures and systems described in the examples herein, such as, for example those described with respect to FIGS. 1-11, although the processes may be implemented in a wide variety of other environments, architectures and systems.

For example, at block 602 the processor 114 may receive digital content corresponding to a guided workout. For instance, as described with respect to FIG. 1, a processor 114 associated with a user device 102 of the system 100 may receive, from a remote server via the content distribution network 106, an audio file, a video file, and/or any other content file including the guided workout from a content source 108. The guided workout may include one or more segment types associated with the workout, such as a warm up segment, one or more running or walking segments, one or more strength segments (e.g., a bootcamp segment), and/or a cool down segment, and the like. In some examples, the guided workout may include one or more visual components and/or one or more audio components, such as a visual of the instructor and/or auditory cues meant to guide the user throughout the workout.

At block 604, the processor 114 may cause a location sensor of the user device 102 to determine location data associated with the user device 102. For example, as described herein, the user 104 may provide a user input allowing for the collection of location data associated with the user device 102, as described herein (e.g., GPS data, motion data, barometer data, etc.). For example, upon selection of the guided workout, a user interface may be generated by the processor 114 requesting permission to collect the location data throughout the duration of the workout. In some examples, the processor 114 may be configured to cause the sensor(s) to collect and determine location data only during segment types during which the user 104 is walking and/or running and may cease collecting data when the user is stationary, such as during strength segments. For example, the processor 114 may utilize the digital content and/or the associated segment information to determine when the strength segments begin. Upon determining that a strength segment has begun, the processor 114 may configure the sensor(s) to stop collecting location data to ensure accurate performance metrics may be determined.

At step 606, the processor 114 may generate at least one of a graphical representation corresponding to the location data or a segmented timeline including a plurality of segments. For example, the processor 114 of the system 100 may utilize the location information and/or digital content to generate a graphical representation, such as a map or diagram of an area surrounding the user 104, that indicates the user's current location, the route that has been traversed during the guided workout, and the like. The graphical representation may include one or more indicator elements representing a current location, distance traversed (e.g., mile markers), segment (e.g., an icon indicating where the warm-up and/or cool down begins and/or ends), and the like.

Further, the processor 114 may generate a segmented timeline utilizing the digital content and/or the location information. The segmented timeline may include one or more segment indicators associated with each segment type. For example, as described herein, the segmented timeline may include a different visual indicator (e.g., a solid line, dashed line, etc.) to represent each segment type of the guided workout. In addition, the segmented timeline may include one or more numerical time indicator to indicate a current elapsed time, time remaining, and the like, associated with the guided workout. Further, the segmented timeline may include a completion indicator, such as a solid line overlaying the visual indicators, indicating the portion of the workout the user has completed.

At step 608, the processor 114 may generate a first user interface including the segmented timeline displayed together with the graphical representation. For example, in response to a user input indicating a selection of a navigational icon representing the map, the processor of the system may be configured to generate a user interface, such as user interface 302 shown in FIG. 3A, that displays the segmented timeline together with the graphical representation, such as a map 308 corresponding to the location data.

At step 610, the processor 114 may generate a listing indicating one or more interactions between users 104. For example, the listing may indicate interactions between the user 104 associated with the user device 102 and one or more users receiving the digital content at the same time on one or more additional user devices. As described herein, the listing of current users may include one or more interaction elements configured to allow the user 104 to interact with other users participating in the guided workout. The interaction listing may visually depict such interactions. For example, the interaction listing may visually depict the high-fives the user 104 has given other participants. Further, the interaction listing may also depict interactions that the other users have given the user 104. For example, the interaction listing may visually depict high-fives that the user has received from the other participants.

Figure 7:
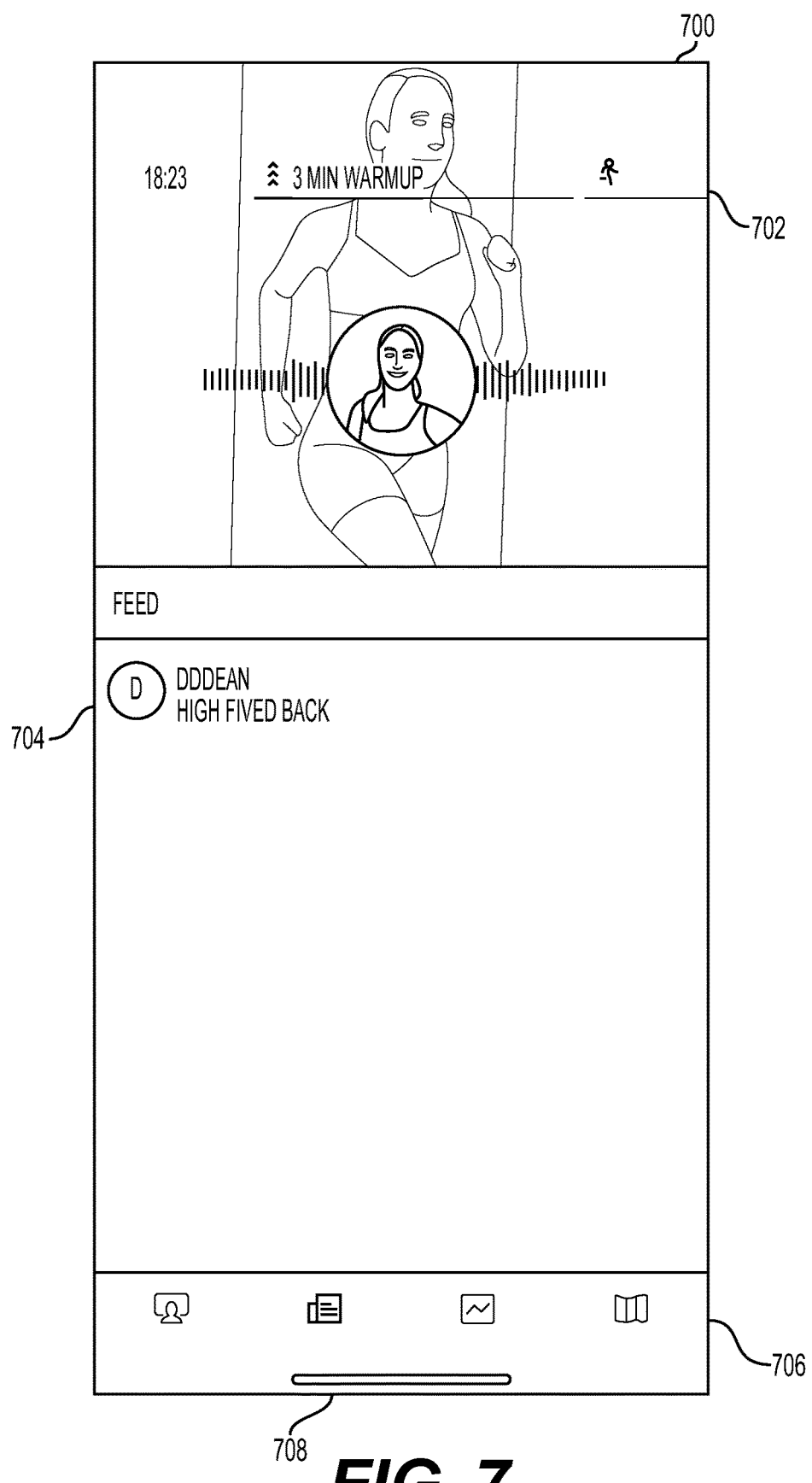
FIG. 7 illustrates another example user interface of the present disclosure. The user interface shown in FIG. 6 corresponds to the method described herein with respect to FIG. 6.

At step 612, the processor 114 may generate a second user interface including the segmented timeline displayed together with the listing. For example, the second user interface may include both the segmented timeline and the interaction listing depicting the interactions between the user and the other participants. Such an example user interface 700 is illustrated in FIG. 7. As shown in FIG. 7, the second user interface 700 may include both the segmented timeline 702 and the listing 704 of the interactions between the user 104 and the current users receiving the digital content. As shown in the listing 704, the user interface 700 includes a user icon and user name corresponding to an additional user that has interacted with the user 104 of the user device 102. Further, as shown in the listing 704, the user interface 700 may include a text description of the interaction. In this example, the text reads "high-fived back" and indicates that the other user has returned a high-five interaction given. For example, as described with respect to the user interface 500 of FIG. 5, a user interface may include one or more interaction elements 506, such as a plurality of hand icons that, when selected by the first user 104, will transmit an indication to the selected user that the first user has congratulated them (e.g., given them a high-five). In this instance, the user shown in listing 704 has returned the high-five.

At step 614, the processor 114 may provide one or more user interface elements configured to allow switching between display of the first user interface and the second user interface during the guided workout. For example, as shown in the user interface 700, each user interface generated by the system may be associated with a navigational user interface element. In this example, the user interface 700 includes four navigational user interface elements 706. For instance, an interaction listing icon 708, highlighted in the user interface 700, may represent a second user interface element that, when selected by the user 104, transitions from displaying the first user interface 302 to displaying the second user interface 700 including the segmented timeline 702 along with the listing 704 of interactions between the user 104 and one or more current users, or class participants. The navigational user interface elements 706 may allow the user 104 to transition between the different user interfaces generated by the system to view real-time, accurate information regarding their guided workout.

Figure 8:
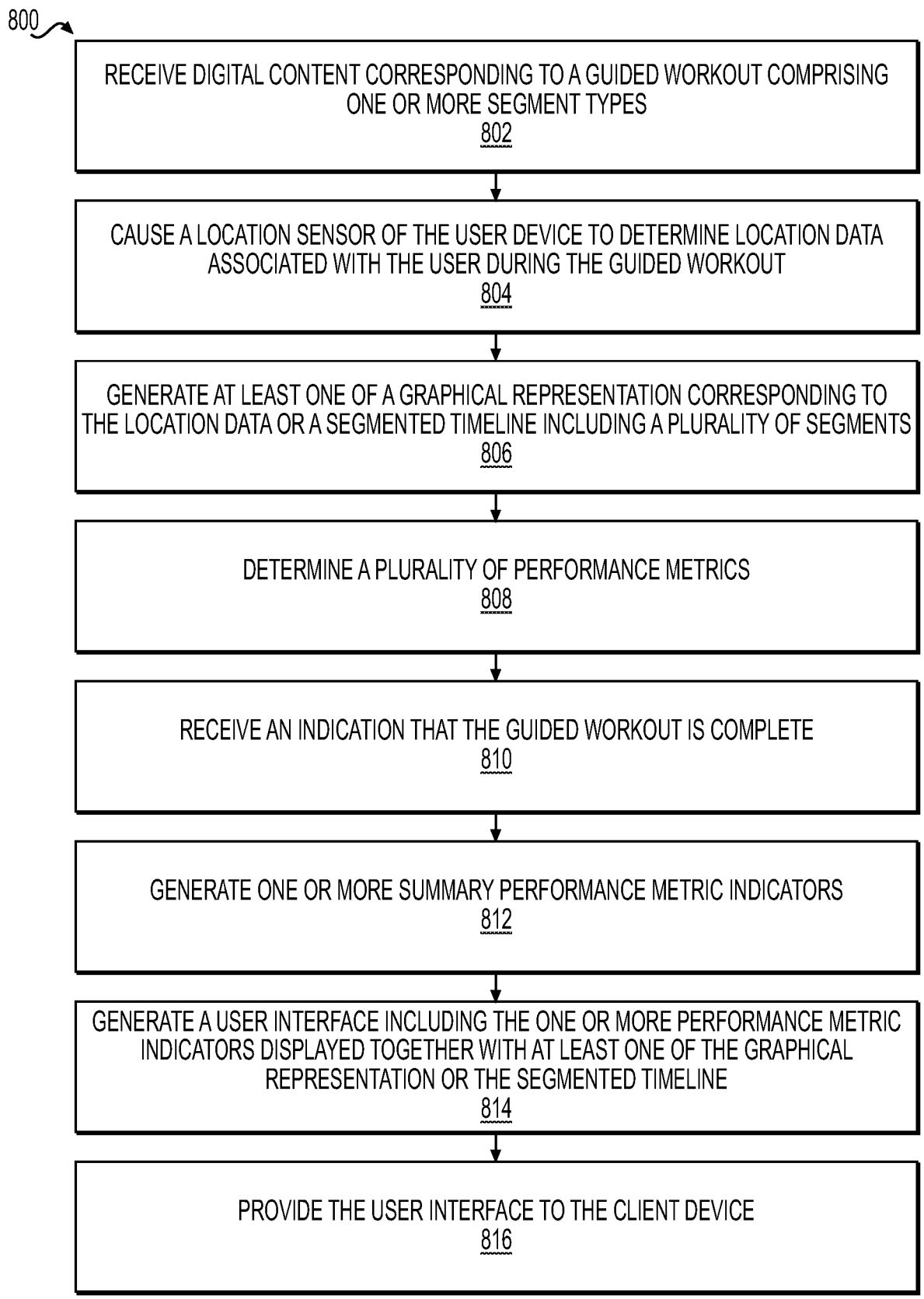
FIG. 8 illustrates another example flow chart corresponding to an example method of the present disclosure.

FIG. 8 illustrates another example flow chart corresponding to an example method of the present disclosure. FIG. 8 illustrates another example flow chart corresponding to an example method of the present disclosure. FIG. 8 provides a flow chart illustrative of an example method 800 of the present disclosure in which a processor generates and provides interactive user interfaces. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted, and any number of the described operations may be combined in any order and/or in parallel to implement process. Any number of the described blocks may be combined in any order and/or in parallel to implement the process, or alternative processes, and not all of the blocks need be executed. It should be understood that some or all of these operations may be performed by some or all of components, devices, and/or systems described herein. For discussion purposes, the processes are described with reference to the environments, architectures and systems described in the examples herein, such as, for example those described with respect to FIGS. 1-11, although the processes may be implemented in a wide variety of other environments, architectures and systems.

For example, at block 802 the system may receive digital content corresponding to a guided workout and comprising one or more segment types. For instance, as described with respect to FIG. 1, a processor 114 associated with a user device 102 of the system 100 may receive, from a remote server via the content distribution network 106, an audio file, a video file, and/or any other content file including the guided workout from a content source 108. The one or more segment types may include, for example, a warm up segment, one or more running or walking segments, one or more strength segments (e.g., a bootcamp segment), and/or a cool down segment, and the like. In some examples, the guided workout may include one or more visual components and/or one or more audio components, such as a visual of the instructor and/or auditory cues meant to guide the user throughout the workout, as well as may be accessed live or on-demand (e.g., previously recorded content).

At block 804, the processor 114 may cause a location sensor of the user device 102 to determine location data associated with the user device 102 during the guided workout. For example, as described herein, the user 104 may provide a user input allowing for the sensor(s) to collection and determine location data associated with the user device 102, as described herein (e.g., GPS data, motion data, barometer data, etc.). For instance, upon selection of the guided workout, a user interface may be generated by a processor 114 of the system 100 requesting permission to collect the location data throughout the duration of the workout. In response to receiving a signal indicating the user input, the processor 114 may cause one or more location sensors of the user device 102 to collect location data. In some examples, the processor 114 may be configured to cause the sensor(s) to determine location data only during segment types during which the user 104 is walking and/or running and may cease collecting data when the user 104 is stationary, such as during strength segments to ensure accuracy of performance metrics.

At step 806, the processor 114 may generate at least one of a graphical representation corresponding to the location data or a segmented timeline including a plurality of segments. For example, the processor 114 may utilize the location data and/or digital content to generate a graphical representation, such as the map 308 of user interface 302 depicted in FIG. 3A, or diagram of an area surrounding the user 104, that indicates the user's current location, the route that has been traversed during the guided workout, and the like. The graphical representation may include one or more indicator elements representing a current location, distance traversed (e.g., mile markers), segment (e.g., an icon indicating where the warm-up and/or cool down begins and/or ends), and the like.

Further, the processor 114 may generate a segmented timeline utilizing the digital content and/or the location information. The segmented timeline may include one or more segment indicators associated with each segment type. For example, as shown in the user interface 306 depicted in FIG. 3B, the segmented timeline 310 may include a different visual indicator (e.g., a solid line, dashed line, etc.) to represent each segment type of the guided workout. In addition, the segmented timeline 310 may include one or more numerical time indicator to indicate a current elapsed time 312, time remaining, and the like, associated with the guided workout. Further, the segmented timeline may include a completion indicator 314, such as a solid line overlaying the visual indicators, indicating the portion of the workout the user 104 has completed.

At step 808, the processor 114 may determine a plurality of performance metrics during the guided workout. For example, the processor 114 may utilize the digital content, location information, and/or motion information to determine one or more performance metrics associated with the user's performance throughout the guided workout. The performance metrics may include, but not be limited to, an average pace, best pace, distance traveled, average speed, heart rate, calories burned, elevation gain, elevation change, achievements earned, and the like. The performance metrics may be calculated based on the user's overall performance throughout the guided workout (e.g., an average speed maintained throughout the workout), or may be based on an individual point in time during the workout. For example, the user 104 may wish to review the performance metrics associated with a particular point in time during the workout and/or a particular location point. In addition, in some examples, the performance metrics may be determined for each split of the workout, such as each mile.

At step 810, the processor 114 may receive an indication that the guided workout is complete. For example, based on the digital content, the processor 114 may receive an indication and/or determine that the guided workout is complete and the entirety of the digital content has been received by the user device 102. As such, the processor may determine that the guided workout is complete and may stop collecting location data and/or determining performance metrics.

At step 812, the processor 114 may generate one or more performance metric indicators. For example, the processor 114 may generate one or more visual indicators associated with individual performance metrics determined at step 808. The performance metric indicators may be configured to provide a visual indication of the performance metric for display to the user 104. For example, the indicators may include numerical indicators, such as a numerical value indicating an average pace, distance, etc.). The indicators may further include a graphical representation of the performance metrics, such as a graphical representation of elevation fluctuations, pace fluctuations, speed fluctuations, distance traveled, mileage splits, heart rate fluctuations, and the like. As described herein, the performance metric indicators may be determined, and depicted, according to each segment, mileage split, individual point in time, and the like.

Figure 9:
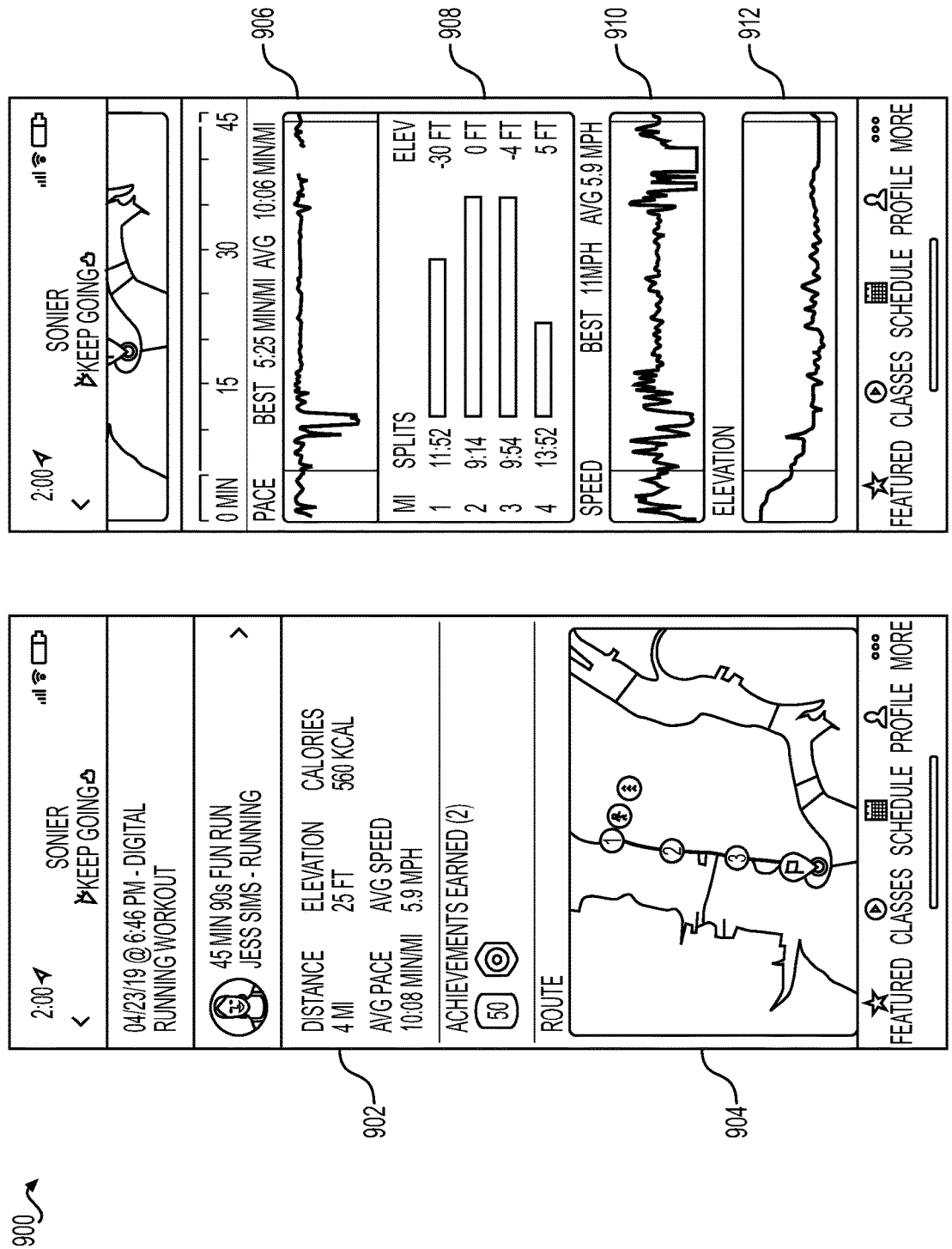
FIG. 9 illustrates another example user interface of the present disclosure. The user interface shown in FIG. 9 corresponds to the method described herein with respect to FIG. 8.
Figure 10:
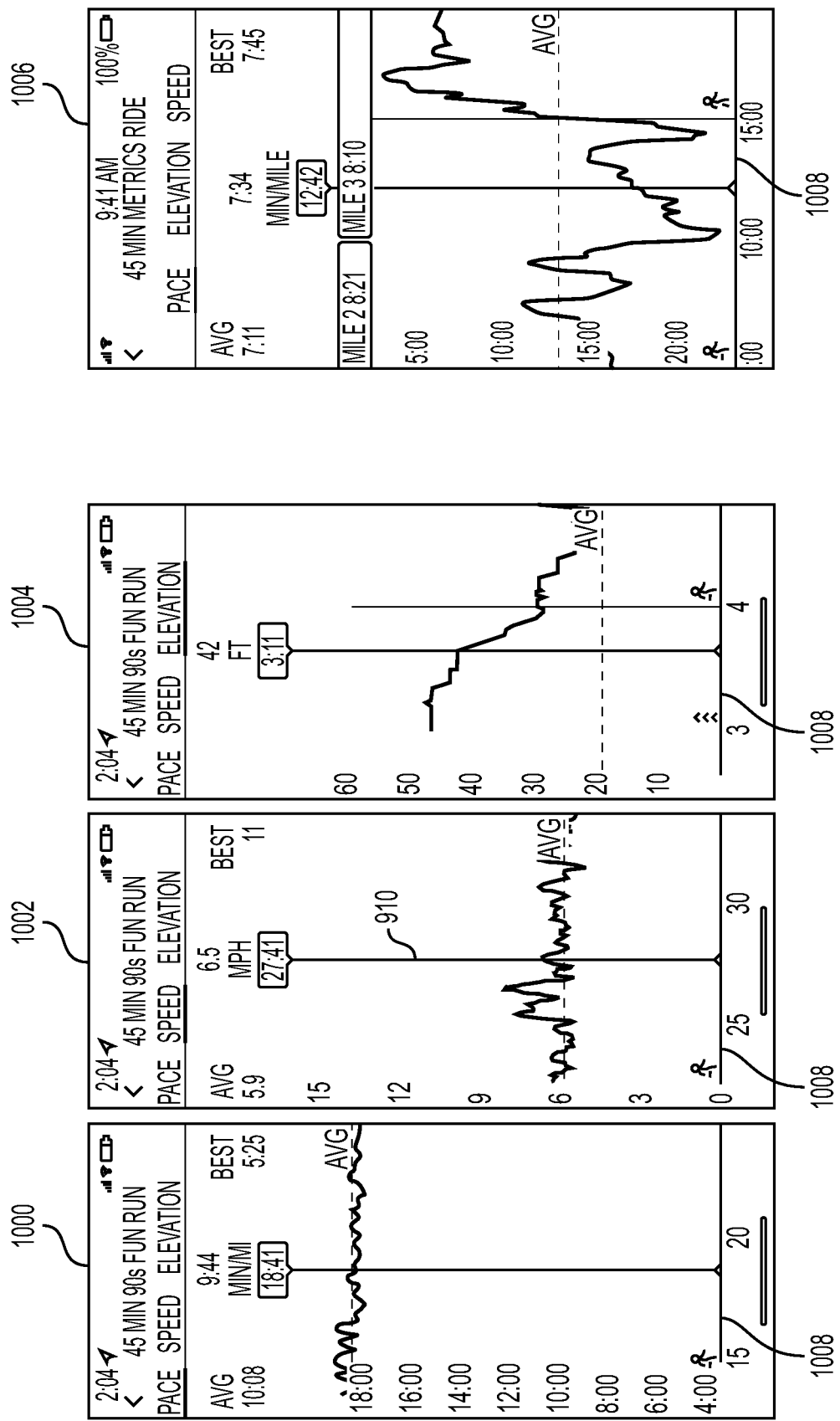
FIG. 10 illustrates another example user interface of the present disclosure. The user interface shown in FIG. 10 corresponds to the method described herein with respect to FIG. 8.

At step 814, the processor 114 may generate a user interface including one or more performance metric indicators displayed together with at least one of the graphical representation or the segmented timeline. As shown in FIGS. 8-10, depicting various user interfaces, the processor may generate a plurality of user interfaces displaying the performance metric indicators. For example, the user 104 may provide user input indicating a performance metric he/she wishes to view. In response, the processor 114 may generate a user interface including the desired performance metric indicator along with at least one of the graphical representation of the location data (e.g., map) or the segmented timeline representing the one or more segments of the workout.

For example, as shown in FIG. 9, the processor 114 may generate a user interface 900 depicting the performance metric indicators determined at step 812. For instance, the user interface 900 includes various performance indicators 902 displayed along with the graphical representation 904. For example, in the user interface 900, the performance metric indicators 902 include numerical values and associated text indicating a distance traversed, an elevation gain, calories burned, heart rate, average pace, average speed, and one or more achievements earned (e.g., number of workouts and the like) by the user during the guided workout. In addition, the graphical representation 904 includes visual indicators of the route traversed, mile markers, segment indicators, and the like. The user interface 900 may be accessed by the user at any time after the completion of the guided workout. For instance, the performance metric indicators and/or the graphical representation may be stored in associated with the user profile of the user. In this way, the user may access information associated with each guided workout on demand.

Further, the user interface 900 may include an option of the user to navigate below the graphical representation 904 to view additional performance metrics. For example, the user interface 900 includes a pace graphic 906 including a graph indicating pace fluctuations of the user along a time graph. Further, the user interface 900 includes various information corresponding to each mile, or split information 908. For example, the split information includes an indicator of each mile of the guided workout, the average pace of the user during the mile, and an elevation change that took place during the mile. In some examples, the user interface 900 further includes both a speed graph 910 and an elevation graph 912, indicating speed and elevation fluctuations, respectively, that took place during the guided workout.

In some examples, as shown in FIG. 10, user interfaces 1000, 1002, 1004, 1006 may be generated to allow the user to view specific performance metrics at a point in time of the guided workout. In this example, each of the user interfaces 1000, 1002, 1004, 1006 may include a segmented timeline 1008 along with the performance metric indicators. The user interfaces 1000, 1002, 1004, 1006 may further include an interface element 1010 that allows the user to navigate along the segmented timeline 1008 and view performance metrics for individual points in time. In this way, the user may navigate to individual times within the guided workout and view their progress along the segmented timeline (e.g., indicating which segment in which the selected time fell), along with one or more performance metrics such as pace, speed, and/or elevation associated with the time. The user interfaces 1000, 1002, 1004, 1006 may further include a graph or plot line that shows fluctuations of each selected metric (e.g., pace, elevation, speed, etc.) throughout the guided workout.

Figure 11:
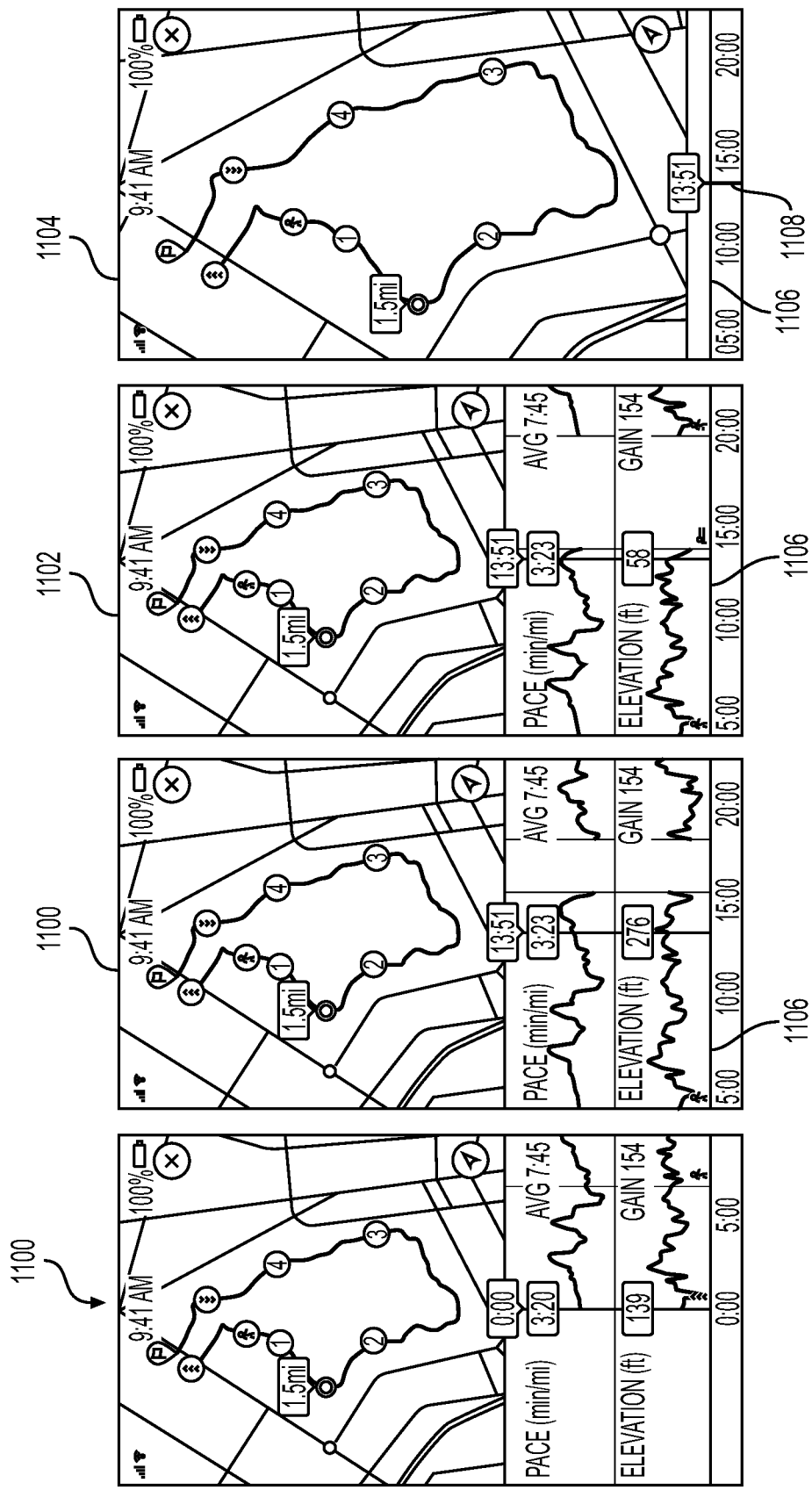
FIG. 11 illustrates another example user interface of the present disclosure. The user interface shown in FIG. 11 corresponds to the method described herein with respect to FIG. 8.

Still further, as shown in FIG. 11, the processor 114 may generate one or more user interfaces 1100, 1102, 1104 displaying a graphical representation along with one or more performance metric indicators. As described herein, the graphical representation may include a map depicting the route traversed, distance indicators (e.g., mile markers), segment indicators, a starting point, a stopping point, and the like. The user interfaces 1100, 1102, 1104 may further include a timeline 1106 with a time navigational element 1108 configured to allow the user to select a time within the completed guided workout at which to view performance metrics. Still further, the user interfaces 1100, 1102, 1104 may include one or more graphics associated with the performance metrics, such as a graphic depicting pace fluctuations and a graphic depicting elevation fluctuations.

For example, in the user interfaces 1100, 1102, 1104, the user 104 has selected time "13:51," indicating a time in the workout where thirteen minutes and fifty-one seconds had elapsed. Corresponding to the time, the user interfaces 1100, 1102, 1104 depict various performance metric indicators such as a pace and elevation of the user at thirteen minutes and fifty-one seconds. The user may adjust the time to view metrics associated with other individual points in time. Further, the user interface may include one or more overall performance metrics, such as a total elevation gain or an average pace.

At step 816, the processor 114 may provide the user interface for display on the client device 102. For example, the processor 114 may cause the user interface to be displayed on a display component 118 of the client device. In some examples, the user interface may be displayed automatically upon detection that the workout is complete at step 810. In other instances, as described herein, the user interface may be generated and displayed in response to a user input indicating the type of interface and desired user interface elements selected by the user 104. In response, the processor 114 may generate and provide a user interface including the selected metrics.

The example clauses below are representative and/or descriptive of example embodiments of the present disclosure. In particular, the example clauses below, either alone or in combination, may describe one or more example embodiments of the present disclosure.

A. A method, comprising: receiving, with a processor associated with a user device, digital content corresponding to a guided workout comprising one or more segment types; causing, with the processor, a location sensor of the user device to determine location data associated with the user device; generating, with the processor, at least one of: a graphical representation corresponding to the location data, the graphical representation indicating a current location of the user device; a performance metric indicator corresponding to the location data; or a segmented timeline including a plurality of segments associated with the one or more segment types and corresponding to at least one of the graphical representation or the performance statistic; generating, with the processor, a first user interface including the segmented timeline displayed together with the graphical representation; generating, with the processor, a second user interface including the segmented timeline displayed together with the performance metric indicator; and providing one or more user interface elements configured to allow switching between display of the first user interface and the second user interface.

B. The method of clause A, wherein the plurality of segments of the segmented timeline include at least a first visual indicia indicative of a first segment type of the one or more segment types and a second visual indicia indicative of a second segment type, the second segment type following the first segment type, the first segment type comprising a first workout activity and the second segment type comprising a second workout activity different from the first workout activity.

C. The method of any of the above clauses, either alone or in combination, further comprising: generating, with the processor, a listing of one or more users receiving the digital content on one or more additional user devices, the listing including at least one of a progress indicator associated with individual users of the one or more users or an interaction element, and the interaction element enabling an interaction between a user associated with the user device and the one or more users; and generating, with the processor, a third user interface including the segmented timeline displayed together with the listing.

D. The method of any of the above clauses, either alone or in combination, further comprising: generating, with the processor a listing indicating one or more interactions between a user associated with the user device and one or more users receiving the digital content on one or more additional user devices; and generating, with the processor, a third user interface including the segmented timeline displayed together with the listing.

E. The method of any of the above clauses, either alone or in combination, wherein the digital content comprises an audio feed received from at least one recording device disposed remote from the user device.

F. The method of any of the above clauses, either alone or in combination, wherein the performance metric indicator is associated with at least one of a current pace, a best pace, an average pace, a distance, an elevation gain, or an amount of calories burned.

G. The method of any of the above clauses, either alone or in combination, further comprising: determining a plurality of performance metric values; receiving an indication that the guided workout is complete; determining, in response to receiving the indication and based at least in part on the plurality of performance metric values, one or more summary performance metric indicators; and generating, with the processor, a third user interface including the one or more summary performance metric indicators displayed together with at least one of the graphical representation or the segmented timeline.

H. The method of any of the above clauses, either alone or in combination, wherein the one or more summary performance metric indicators indicate at least one of: an average value associated with the plurality of performance metric values; or an individual performance metric value of the plurality of performance metric values associated with a point in time during the guided workout.

I. A system, comprising: memory; one or more processors; and one or more computer-executable instructions stored in the memory and executable by the one or more processors to perform operations comprising: receiving digital content corresponding to a guided workout comprising one or more segment types; receiving one or more signals indicating location data associated with a user device during the guided workout; generating at least one of a graphical representation corresponding to the location data or a segmented timeline including a plurality of segments associated with the one or more segment types and corresponding to the graphical representation; generating a user interface including the segmented timeline displayed together with the graphical representation; and providing the user interface to the user device.

J. The system of clause I, wherein the user interface comprises a first user interface and the operations further comprising: generating a performance metric indicator corresponding to the location data; generating a second user interface including the segmented timeline displayed together with the performance metric indicator; and providing the second user interface to the user device.

K. The system of any of the clauses above, either alone or in combination, wherein the performance metric indicator is associated with at least one of a current pace, a best pace, an average pace, a distance, an elevation gain, or an amount of calories burned.

L. The system of any of the clauses above, either alone or in combination, the operations further comprising providing one or more user interface elements configured to allow switching between display of the first user interface and the second user interface during the guided workout.

M. The system of any of the clauses above, either alone or in combination, wherein the user interface comprises a first user interface and the operations further comprising: determining a plurality of performance metric values; receiving an indication that the guided workout is complete; generating, in response to receiving the indication and based at least in part on the plurality of performance metric values, one or more summary performance metric indicators; and generating a second user interface including the one or more summary performance metric indicators displayed together with at least one of the graphical representation or the segmented timeline.

N. The system of any of the clauses above, either alone or in combination, wherein the one or more summary performance metric indicators indicate at least one of: an average value associated with the plurality of performance metric values determined during the guided workout; or an individual performance metric value of the plurality of performance metric values associated with a point in time during the guided workout.

O. The system of any of the clauses above, either alone or in combination, wherein the graphical representation includes a location indicator indicating the location of the user device corresponding to the point in time during the guided workout associated with the individual performance metric value.

P. The system of any of the clauses above, either alone or in combination, wherein the one or more summary performance metric indicators include one or more additional graphical representations corresponding to the plurality of performance metric values.

Q. A method, comprising: receiving, at a user device, digital content corresponding to a guided workout; causing a location sensor of the user device to determine location data associated with the user device during the guided workout; generating a segmented timeline including a plurality of segments associated with the guided workout and corresponding to the graphical representation; determining, based at least in part on the location data, a performance metric indicator corresponding to a current location of the user device; generating, during the guided workout, a user interface including the segmented timeline and the performance metric indicator; and providing the user interface to the user device.

R. The method of any of the clauses above, either alone or in combination, wherein the performance metric comprises a first performance metric and the user interface comprises a first user interface, the method further comprising: determining, based at least in part on the location data, a second performance metric indicator corresponding to the current location of the user device; generating, during the guided workout, a second user interface including the segmented timeline and the second performance metric indicator; and providing the second user interface to the user device.

S. The method of any of the clauses above, either alone or in combination, wherein the first performance metric indicator and the second performance metric indicator are associated with at least one of a current pace, a best pace, an average pace, a distance, an elevation gain, or an amount of calories burned.

T. The method of any of the clauses above, either alone or in combination, wherein the user device includes at least one of a mobile device or a wearable device.

CONCLUSION

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples and applications illustrated and described, and without departing from the spirit and scope of the present invention, which is set forth in the following claims.

What is claimed is:

1. A method, comprising:
receiving, with a processor associated with a user device, digital content corresponding to a guided workout comprising one or more segment types;
causing, with the processor, a location sensor of the user device to determine location data associated with the user device;
generating, with the processor, at least one of:
a graphical representation corresponding to the location data, the graphical representation indicating a current location of the user device;
a performance metric indicator corresponding to the location data; or
a segmented timeline including a plurality of segments associated with the one or more segment types and corresponding to at least one of the graphical representation or the performance statistic;
generating, with the processor, a first user interface including the segmented timeline displayed together with the graphical representation;
generating, with the processor, a second user interface including the segmented timeline displayed together with the performance metric indicator; and
providing one or more user interface elements configured to allow switching between display of the first user interface and the second user interface.

2. The method of claim 1, wherein the plurality of segments of the segmented timeline include at least a first visual indicia indicative of a first segment type of the one or more segment types and a second visual indicia indicative of a second segment type, the second segment type following the first segment type,
the first segment type comprising a first workout activity and the second segment type comprising a second workout activity different from the first workout activity.

3. The method of claim 1, further comprising:
generating, with the processor, a listing of one or more users receiving the digital content on one or more additional user devices, the listing including at least one of a progress indicator associated with individual users of the one or more users or an interaction element, and the interaction element enabling an interaction between a user associated with the user device and the one or more users; and
generating, with the processor, a third user interface including the segmented timeline displayed together with the listing.

4. The method of claim 1, further comprising:
generating, with the processor a listing indicating one or more interactions between a user associated with the user device and one or more users receiving the digital content on one or more additional user devices; and
generating, with the processor, a third user interface including the segmented timeline displayed together with the listing.

5. The method of claim 1, wherein the digital content comprises an audio feed received from at least one recording device disposed remote from the user device.

6. The method of claim 1, wherein the performance metric indicator is associated with at least one of a current pace, a best pace, an average pace, a distance, an elevation gain, or an amount of calories burned.

7. The method of claim 1, further comprising:
determining a plurality of performance metric values;
receiving an indication that the guided workout is complete;
determining, in response to receiving the indication and based at least in part on the plurality of performance metric values, one or more summary performance metric indicators; and
generating, with the processor, a third user interface including the one or more summary performance metric indicators displayed together with at least one of the graphical representation or the segmented timeline.

8. The method of claim 7, wherein the one or more summary performance metric indicators indicate at least one of:
an average value associated with the plurality of performance metric values; or
an individual performance metric value of the plurality of performance metric values associated with a point in time during the guided workout.

9. A system comprising:
memory;
one or more processors; and
one or more computer-executable instructions stored in the memory and executable by the one or more processors to perform operations comprising:
receiving digital content corresponding to a guided workout comprising one or more segment types;
receiving one or more signals indicating location data associated with a user device during the guided workout;
generating at least one of a graphical representation corresponding to the location data or a segmented timeline including a plurality of segments associated with the one or more segment types and corresponding to the graphical representation;
generating a user interface including the segmented timeline displayed together with the graphical representation; and
providing the user interface to the user device.

10. The system of claim 9, wherein the user interface comprises a first user interface and the operations further comprising:
generating a performance metric indicator corresponding to the location data;
generating a second user interface including the segmented timeline displayed together with the performance metric indicator; and
providing the second user interface to the user device.

11. The system of claim 10, wherein the performance metric indicator is associated with at least one of a current pace, a best pace, an average pace, a distance, an elevation gain, or an amount of calories burned.

12. The system of claim 10, the operations further comprising providing one or more user interface elements configured to allow switching between display of the first user interface and the second user interface during the guided workout.

13. The system of claim 10, wherein the user interface comprises a first user interface and the operations further comprising:
determining a plurality of performance metric values;
receiving an indication that the guided workout is complete;
generating, in response to receiving the indication and based at least in part on the plurality of performance metric values, one or more summary performance metric indicators; and
generating a second user interface including the one or more summary performance metric indicators displayed together with at least one of the graphical representation or the segmented timeline.

14. The method of claim 13, wherein the one or more summary performance metric indicators indicate at least one of:
an average value associated with the plurality of performance metric values determined during the guided workout; or
an individual performance metric value of the plurality of performance metric values associated with a point in time during the guided workout.

15. The system of claim 14, wherein the graphical representation includes a location indicator indicating the location of the user device corresponding to the point in time during the guided workout associated with the individual performance metric value.

16. The system of claim 14, wherein the one or more summary performance metric indicators include one or more additional graphical representations corresponding to the plurality of performance metric values.

17. A method, comprising:
receiving, at a user device, digital content corresponding to a guided workout;
causing a location sensor of the user device to determine location data associated with the user device during the guided workout;
generating a segmented timeline including a plurality of segments associated with the guided workout and corresponding to the graphical representation;
determining, based at least in part on the location data, a performance metric indicator corresponding to a current location of the user device;
generating, during the guided workout, a user interface including the segmented timeline and the performance metric indicator; and
providing the user interface to the user device.

18. The method of claim 17, wherein the performance metric comprises a first performance metric and the user interface comprises a first user interface, the method further comprising:
- determining, based at least in part on the location data, a second performance metric indicator corresponding to the current location of the user device;
- generating, during the guided workout, a second user interface including the segmented timeline and the second performance metric indicator; and
- providing the second user interface to the user device.

19. The method of claim 18, wherein the first performance metric indicator and the second performance metric indicator are associated with at least one of a current pace, a best pace, an average pace, a distance, an elevation gain, or an amount of calories burned.

20. The method of claim 17, wherein the user device includes at least one of a mobile device or a wearable device.

\* \* \* \* \*